(12) United States Patent
Teramoto et al.

(10) Patent No.: US 12,117,343 B2
(45) Date of Patent: Oct. 15, 2024

(54) SAMPLE ANALYSIS SYSTEM, LEARNED MODEL GENERATION METHOD, AND SAMPLE ANALYSIS METHOD

(71) Applicant: National Institute of Advanced Industrial Science and Technology, Tokyo (JP)

(72) Inventors: Yoshiyuki Teramoto, Tsukuba (JP); Masaki Torimura, Tsukuba (JP); Taizo Sano, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 220 days.

(21) Appl. No.: 17/904,383

(22) PCT Filed: Dec. 10, 2020

(86) PCT No.: PCT/JP2020/045999
§ 371 (c)(1),
(2) Date: Aug. 17, 2022

(87) PCT Pub. No.: WO2021/166388
PCT Pub. Date: Aug. 26, 2021

(65) Prior Publication Data
US 2023/0070781 A1    Mar. 9, 2023

(30) Foreign Application Priority Data
Feb. 21, 2020  (JP) ................................ 2020-028438

(51) Int. Cl.
*G01J 3/443*    (2006.01)
*G01J 3/28*    (2006.01)
(Continued)

(52) U.S. Cl.
CPC ............ *G01J 3/443* (2013.01); *G01N 21/255* (2013.01); *G01N 21/31* (2013.01); *G01J 2003/2859* (2013.01)

(58) Field of Classification Search
CPC .... G01J 2003/2859; G01J 3/28; G01J 3/2803; G01J 3/443; G01N 21/255; G01N 21/31; G01N 21/68; G01N 21/73
See application file for complete search history.

(56) References Cited

U.S. PATENT DOCUMENTS 9,177,772 B1    11/2015  Wiederin et al.
2002/0005949 A1    1/2002  Uemura
(Continued)

FOREIGN PATENT DOCUMENTS

| CN | 109063773 A | 12/2018 |
|---|---|---|
| CN | 109142253 A | 1/2019 |

(Continued)

OTHER PUBLICATIONS

International Search Report and Written Opinion mailed on Mar. 2, 2021, received for PCT Application PCT/JP2020/045999, filed on Dec. 10, 2020, 8 pages including English Translation.

*Primary Examiner* — Hina F Ayub
(74) *Attorney, Agent, or Firm* — XSENSUS LLP

(57) ABSTRACT

Provided is a sample analysis system including: a droplet device configured to intermittently introduce a sample to a measurement region set in plasma; a light emission detection device configured to detect light emission in the measurement region at a detection timing, the detection timing being set at a predetermined cycle in advance; and an analysis device configured to analyze the sample based on the detected light emission, wherein the analysis device is provided with: a distribution computing unit configured to compute a time-spatial light intensity distribution based on the detected light emission, the time-spatial light intensity (Continued)

distribution being a distribution of a light intensity according to the detection timing, a position in the measurement region, and a wavelength component of the light emission; and a characteristic specifying unit configured to compute, from the time-spatial light intensity distribution, a feature amount that correlates with a sample characteristic indicating a property of the sample and specify the sample characteristic based on the feature amount.

18 Claims, 15 Drawing Sheets

(51) Int. Cl.
 *G01N 21/25* (2006.01)
 *G01N 21/31* (2006.01)

(56) References Cited

U.S. PATENT DOCUMENTS

| | | |
|---|---|---|
| 2003/0034281 A1 | 2/2003 | Kumar |
| 2003/0223055 A1 | 12/2003 | Agarwal et al. |
| 2010/0271631 A1* | 10/2010 | Schluter ............... H01J 49/105 250/288 |
| 2013/0095004 A1 | 4/2013 | Okino et al. |
| 2015/0276484 A1 | 10/2015 | Matsuzawa |
| 2017/0109874 A1 | 4/2017 | Hallasch et al. |
| 2021/0272784 A1 | 9/2021 | Teramoto et al. |

FOREIGN PATENT DOCUMENTS

| | | |
|---|---|---|
| CN | 109345506 A | 2/2019 |
| CN | 110705372 A | 1/2020 |
| JP | 62-282247 A | 12/1987 |
| JP | 2791275 B2 | 8/1998 |
| JP | 2002-5837 A | 1/2002 |
| JP | 3134776 U | 8/2007 |
| JP | 2009-229387 A | 10/2009 |
| JP | 2012-55840 A | 3/2012 |
| JP | 2014-215055 A | 11/2014 |
| JP | 2018-018354 A | 2/2018 |
| WO | 00/31513 A1 | 6/2000 |
| WO | 2006/137205 A1 | 12/2006 |

* cited by examiner (a)
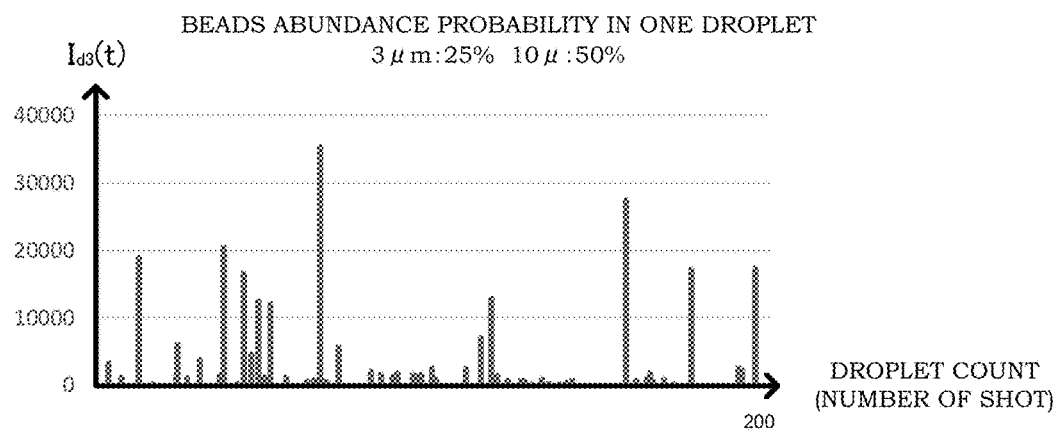
(b)
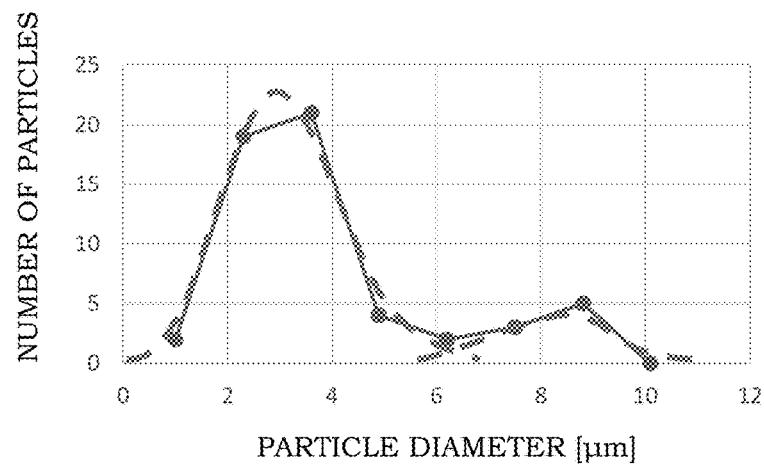
FIG. 12

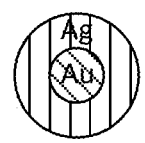
Ag 90 nm
Au 20 nm
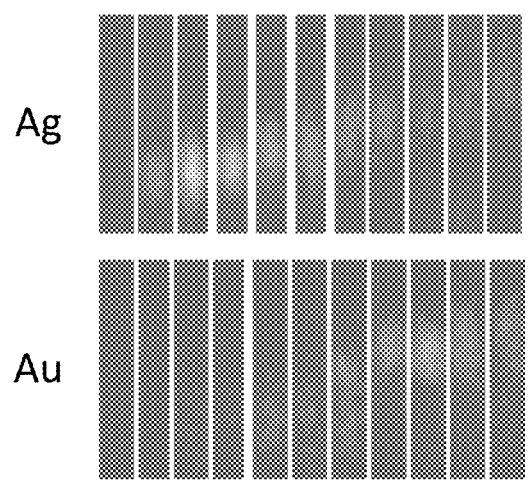
FIG. 14

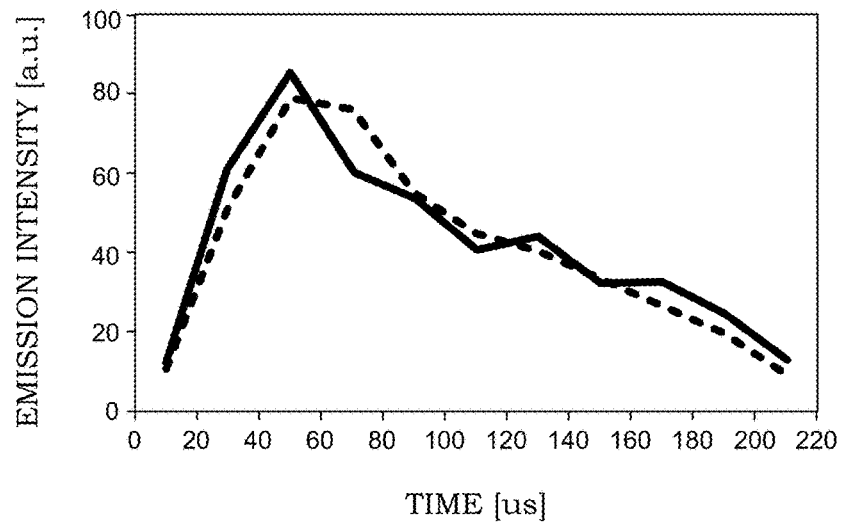
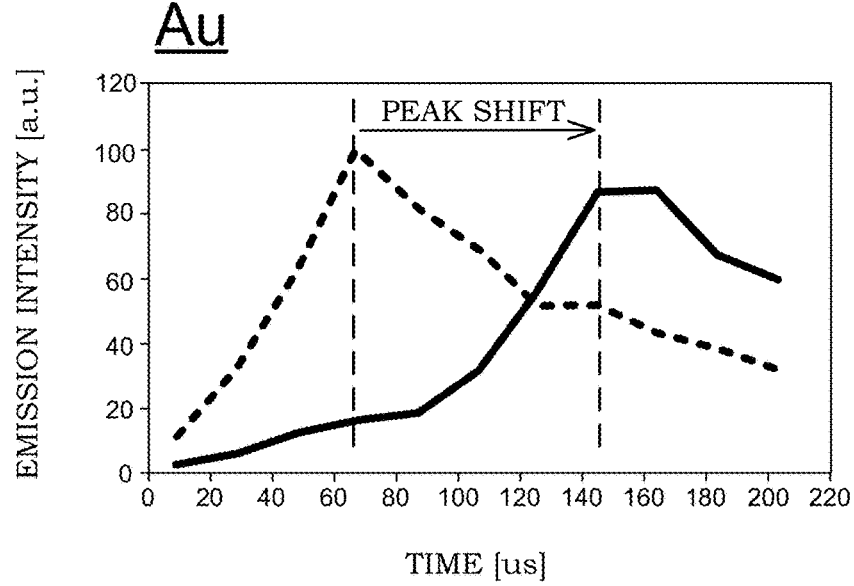
FIG. 15

SAMPLE ANALYSIS SYSTEM, LEARNED MODEL GENERATION METHOD, AND SAMPLE ANALYSIS METHOD

CROSS-REFERENCE TO RELATED APPLICATIONS

The present application is based on PCT filing PCT/JP2020/045999, filed Dec. 10, 2020, which claims priority to JP 2020-028438, filed Feb. 21, 2020, the entire contents of each are incorporated herein by reference.

TECHNICAL FIELD

The present invention relates to a sample analysis system, a learned model generation method, and a sample analysis method.

BACKGROUND ART

In an inductively coupled plasma (ICP) atomic emission spectrometer that uses plasma as an atomization source or an ionization source, an analysis of a composition of a sample is performed on the basis of an emission spectrum that is obtained by feeding the sample to plasma source for plasmaization (excitation) and subjecting light emitted from the plasma to resolution of wavelength.

JP2002-5837A proposes a spectrophotometric analyzer in which the light emitted from the plasma is resolved by a spectrometer, a detection is performed by a plurality of CCD (Charge Coupled Device) photodetectors so as to be associated with positions in the plasma, and on the basis of the detection results, a distribution of emission intensities at every positions in the plasma is detected.

SUMMARY OF INVENTION

However, in the conventional ICP emission spectrophotometric analysis including that disclosed in JP2002-5837A, information that can be specified from an emission spectrum is limited to the constituent elements of the sample. In other words, the characteristics of the sample other than constituent elements cannot be analyzed from the emission spectrum obtained by the conventional ICP emission spectrophotometric analysis.

Therefore, an object of the present invention is to provide an analysis procedure capable of specifying a wide variety of sample characteristics other than constituent elements from excitation light emitted from plasma of the sample.

According to an aspect of the present invention, provided is a sample analysis system provided with: a droplet device configured to intermittently introduce a sample to a measurement region set in plasma; a light emission detection device configured to detect light emission in the measurement region at a detection timing, the detection timing being set at a predetermined cycle in advance; and an analysis device configured to analyze the sample on the basis of the detected light emission. The analysis device is provided with: a distribution computing unit configured to compute a time-spatial light intensity distribution based on the detected light emission, the time-spatial light intensity distribution being a distribution of a light intensity according to the detection timing, a position in the measurement region, and a wavelength component of the light emission; and a characteristic specifying unit configured to compute, from the time-spatial light intensity distribution, a feature amount that correlates with a sample characteristic indicating a property of the sample and specify the sample characteristic based on the feature amount.

According to another aspect of the present invention, provided is a learned model generation method for generating a learned model, the learned model using a time-spatial light intensity distribution related to a sample as an input and a sample characteristic indicating a property of the sample as an output. The learned model generation method includes a processing of executing a machine learning by using the time-spatial light intensity distribution related to a known sample as an input and a known characteristic indicating a property of the known sample as an output. The time-spatial light intensity distribution is acquired by: intermittently introducing the known sample to a measurement region set in plasma; detecting light emission caused in the measurement region at a detection timing, the detection timing being set at a predetermined cycle in advance; and performing computation of the time-spatial light intensity distribution as a distribution of light intensity based on the detected light emission, the distribution of light intensity depending on the detection timing, a position in the measurement region, and a wavelength component.

According to further aspect of the present invention, provided is a learned model generation method for generating a learned model, the learned model using a time series image group related to a sample as an input and a sample characteristic indicating a property of the sample as an output. This learned model generation method includes a processing of executing a machine learning by using the time series image group related to a known sample as an input and a known characteristic indicating a property of the known sample as an output. The time series image group is acquired by: intermittently introducing the known sample to a measurement region set in plasma; and performing image acquisition of light emission caused in the measurement region at an image acquisition timing, the image acquisition timing being set at a predetermined cycle in advance.

According to even further aspect of the present invention, provided is a sample analysis method executed by using the generated learned model. In the sample analysis method, setting the time-spatial light intensity distribution or the time series image group obtained for the unknown sample, as the input for the learned model, and an output data is specified as the unknown characteristic indicating the property of the unknown sample.

BRIEF DESCRIPTION OF DRAWINGS

FIG. 12 is a diagram showing a particle diameter portion of the microplastics contained in a liquid sample in Example 2.

FIG. 14 is a diagram showing the time series image group acquired for the liquid sample (containing core shell particles formed of Ag and Au) according to Example 2.

FIG. 15 is a diagram showing time-spatial light intensity distributions of two kinds of liquid samples according to Example 2.

DESCRIPTION OF EMBODIMENTS

In the following, respective embodiments of the present invention will be described with reference to the drawings.

First Embodiment

Figure 1:
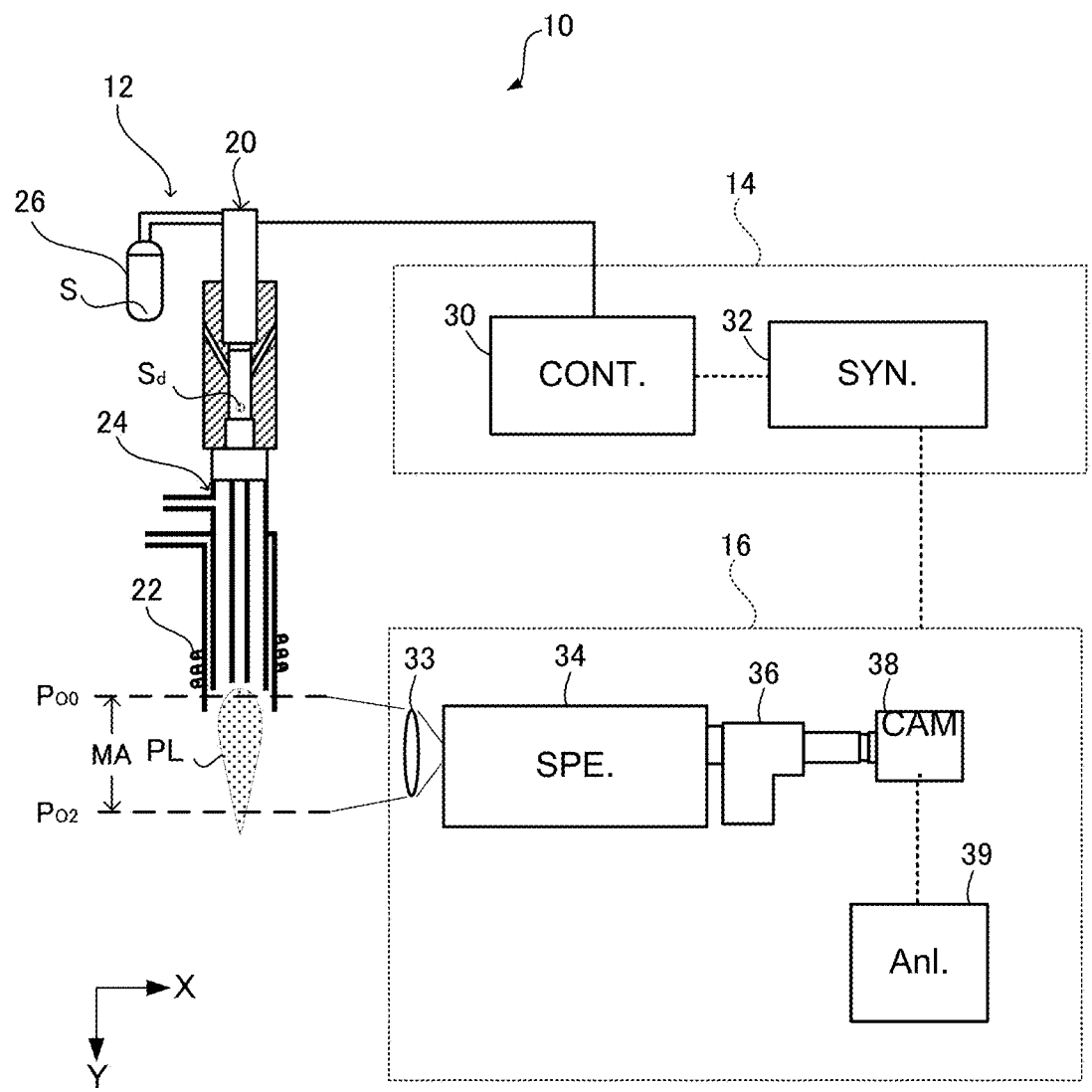
FIG. 1 is a diagram for explaining a configuration of a common sample analysis system for respective embodiments of the present invention.

FIG. 1 is a diagram for explaining a configuration of a sample analysis system 10 according to this embodiment. As shown in the figure, the sample analysis system 10 has a droplet device 12, a sample feed control device 14, and plasma measuring unit 16 serving as a measuring device.

Figure 2:
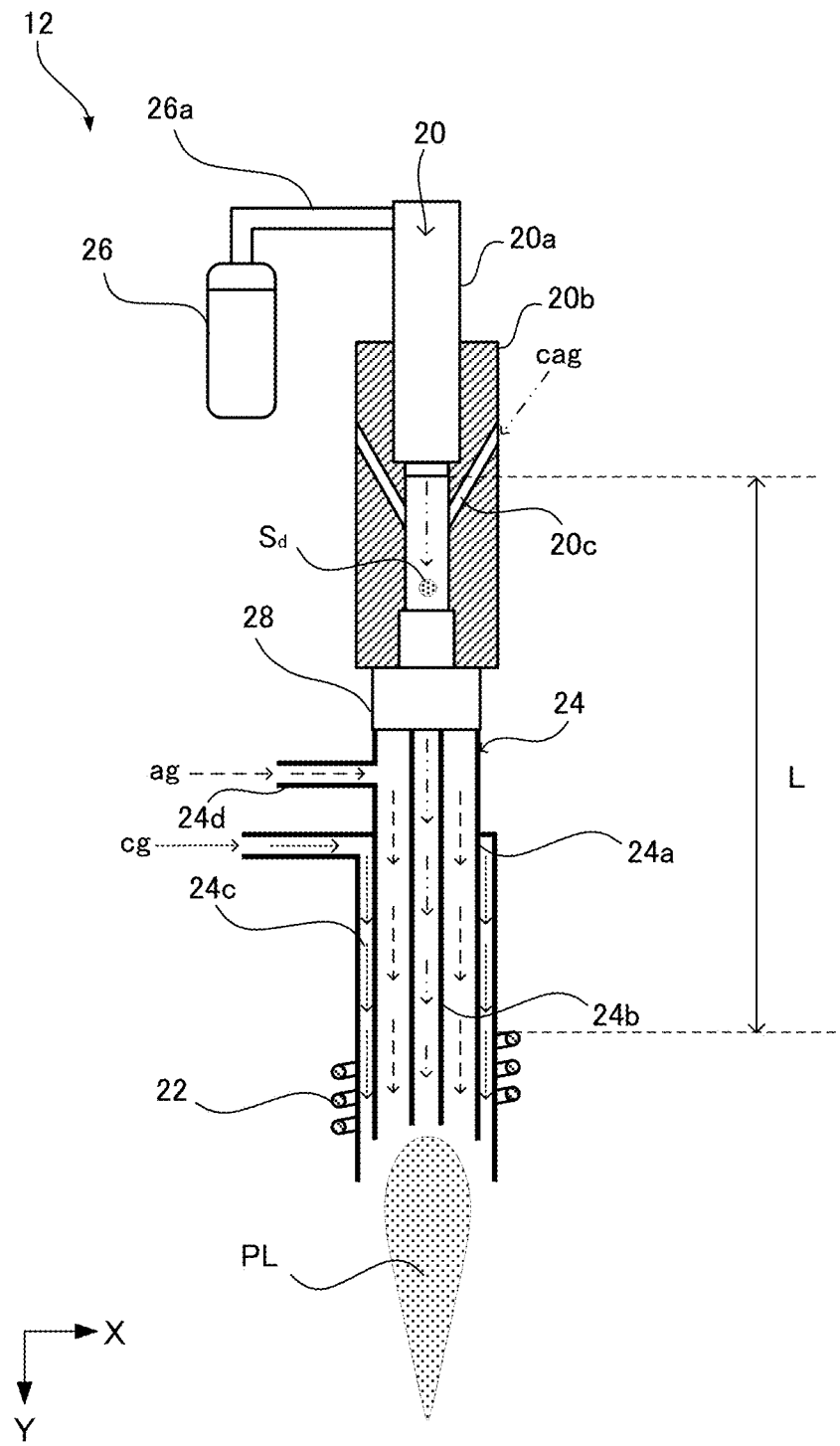
FIG. 2 is a diagram showing a configuration a droplet device.

FIG. 2 is a diagram showing a configuration of the droplet device 12. The droplet device 12 intermittently feeds a liquid sample S serving as a measurement target to plasma PL in a form of a sample drop $S_d$.

Here, as the liquid sample S in this embodiment, a mixed liquid formed by mixing one or more kinds of particles p into liquid such as water, etc. at a predetermined proportion is assumed. In the following, a proportion of the particles p contained in the mixed liquid forming the liquid sample S is referred to as "a particle concentration $Co_p$". A concept of the particle concentration $Co_p$ includes known arbitrary definitions for a concentration such as a mass concentration, a concentration of amount of substance, a volume concentration, and so forth.

In addition, in the description, the particles p includes both of single element particles formed of a single kind of element in an arbitrary associated form (a crystalline structure, an amorphous structure, or the like) and multi-element particles formed of a plurality of kinds of elements that are mutually combined in an arbitrary associated form (a solid solution, a core shell, supported, or the like). Furthermore, the composition of the particles p means one or more elements forming the particles p. For example, in a case in which the particles p are polystyrene beads, the composition of the particle p is C (carbon) and H (hydrogen).

Referring back to FIG. 2, the droplet device 12 is provided with a droplet head 20 and plasma torch 24.

The droplet head 20 is provided with an opening and closing mechanism 20a and a sample guide 20b that are provided in this order from the top in the vertical direction (in the negative direction in the Y-axis).

The opening and closing mechanism 20a is connected via a sample feeding capillary 26a to a sample storage container 26 arranged above the droplet device 12. The opening and closing mechanism 20a is opened/closed such that a shut-off state and a communication state for the liquid sample S kept under a negative pressure state in the sample feeding capillary 26a are switched and injects the sample drop $S_d$ into the sample guide 20b intermittently.

More specifically, the opening and closing mechanism 20a is formed of a piezoelectric element, etc. that is expanded/contracted intermittently so as to feed the sample drop $S_d$ into the sample guide 20b at a predetermined opening and closing cycle $\Delta T_f$ (for example, several Hz to several ten kHz). With such a configuration, the liquid sample S that is kept under the negative pressure state in the sample feeding capillary 26a is injected into the sample guide 20b in a dropwise manner as the sample drop $S_d$ having a drop diameter $r_d$ depending on the opening and closing cycle $\Delta T_f$ in the opening and closing mechanism 20a.

In this embodiment, the opening and closing cycle $\Delta T_f$ is set such that the drop diameter $r_d$ takes a suitable value depending on the particle concentration $Co_p$ in the above-described liquid sample S. A specific setting of the opening and closing cycle $\Delta T_f$ will be described later.

The sample guide 20b forms a sample passage for guiding the sample drop $S_d$ that has been injected by the opening and closing mechanism 20a into the direction towards the plasma torch 24. More specifically, the opening and closing mechanism 20a is attached to the sample guide 20b at its upper part, and the sample guide 20b is formed to have a tubular shape within which a space that communicates with an injection port of the opening and closing mechanism 20a for the sample drop $S_d$ is formed. In addition, career gas introduction channels 20c are provided in a wall portion of the sample guide 20b.

The career gas introduction channels 20c are passages for introducing a career gas cag that guides the sample drop $S_d$ in the direction towards the plasma PL. The career gas introduction channels 20c are each formed so as to have a notch-shape that obliquely intersect with the extending direction (the vertical direction) of the wall portion of the tubular sample guide 20b. In other words, the career gas introduction channels 20c have a configuration in which the career gas introduction channels 20c extend obliquely with respect to the wall portion of the sample guide 20b such that the career gas cag has a vertically downward flow direction component in the sample guide 20b.

Therefore, by causing the career gas cag to flow through the career gas introduction channels 20c, it is possible to suitably guide the sample drop $S_d$ in the sample guide 20b in the direction towards the plasma PL by the flow of the career gas cag.

An amount of the career gas cag to be introduced from the career gas introduction channels 20c can be adjusted appropriately in accordance with factors such as the drop diameter $r_d$ of the sample drop $S_d$, for example. For example, the volumetric flow rate of the career gas cag can be set so as to fall within a range from 0 to 1 liter/min. In addition, as the career gas cag, it is preferable to use an inert gas from the view point of avoiding an inhibition of a stable generation of the plasma PL while achieving the function of guiding the sample drop $S_d$ to the plasma PL, and it is particularly preferable to use the argon gas.

In addition, in the configuration of the droplet device 12 of this embodiment, the plasma PL is generated at a lower position in the vertical direction relative to the droplet head 20. Therefore, the sample drop $S_d$ that has been injected into the sample guide 20b from the opening and closing mechanism 20a moves downward towards the plasma PL in the vertical direction (in the positive direction in the Y-axis). Therefore, the sample drop $S_d$ is guided in the direction towards the plasma PL due to the effect of the gravitational force, and thus, it is possible to suitably make the sample drop $S_d$ reach the plasma PL even without using the career gas cag. Thus, with the configuration of the droplet device 12 of this embodiment, it is also possible to set the volumetric flow rate of the career gas cag so as to fall within a relatively low range (for example, 0 to 0.1 liter/min).

On the other hand, the plasma torch 24 is connected to a lower end of the sample guide 20b via a connector 28. In addition, the plasma torch 24 is provided with a coil 22 as plasma generation means for generating the plasma PL. The plasma torch 24 is provided with supply passages of various gases for performing stable generation of the plasma PL and for cooling and functions as a guiding passage for guiding the sample drop $S_d$ from the sample guide 20b to the plasma PL.

More specifically, the plasma torch 24 is provided with a torch main body 24a, a sample capillary 24b serving as the sample passage, and a cooling gas supply channel 24c.

The torch main body 24a is connected to the lower end of the sample guide 20b of the droplet head 20 at its upper end via the connector 28. The torch main body 24a is formed of a material such as quartz, etc., for example, so as to have a substantially cylindrical shape such that the sample capillary 24b is formed inside.

Furthermore, an auxiliary gas introduction tube 24d for introducing an auxiliary gas ag (intermediate gas) for causing the generated the plasma PL to float below the torch main body 24a is connected to a side wall of the torch main body 24a in the vicinity of the sample guide 20b (a relatively upper region in the vertical direction).

More specifically, the auxiliary gas introduction tube 24d is connected to the torch main body 24a so as to communicate with a space formed between the torch main body 24a and the sample capillary 24b. Therefore, the auxiliary gas ag that is introduced through the auxiliary gas introduction tube 24d flows towards the plasma PL through the space formed between the torch main body 24a and the sample capillary 24b.

An amount of the auxiliary gas ag introduced from the auxiliary gas introduction tube 24d can be set arbitrarily from the viewpoint of how far the distance from a lower end of the torch main body 24a to the position of the plasma PL generated is to be set (the floating distance of the plasma PL). For example, the volumetric flow rate of the auxiliary gas ag can be set so as to fall within a range from 1 to 1.5 liter/min. In addition, as the auxiliary gas ag, it is preferable to use the inert gas having a low reactivity from the view point of avoiding the inhibition of the stable generation of the plasma PL while achieving the function of causing the plasma PL to float below the torch main body 24a, and it is particularly preferable to use the argon gas.

The sample capillary 24b is provided inside the torch main body 24a so as to extend from the lower end of the sample guide 20b to a lower end of the coil 22. More specifically, the sample capillary 24b communicates with an interior of the sample guide 20b at its upper end via the connector 28 and extends in the vertical direction such that its lower end is positioned in the vicinity of an upper end of the coil 22. In particular, the length of the sample capillary 24b is set so as to be equal to or longer than a predetermined value that is defined from the view point of suppressing an effect of the magnetic field generated by the coil 22 on the droplet head 20. Thus, it is preferable to configure the sample capillary 24b such that the sum of the extended length of the sample guide 20b in the vertical direction and the length of the sample capillary 24b (in other words, a distance L between a lower end of the opening and closing mechanism 20a and the upper end of the coil 22) is about several ten centimeters, for example.

In addition, on an outer circumference of the torch main body 24a below the auxiliary gas introduction tube 24d, the cooling gas supply channel 24c for supplying a cooling gas cg (coolant gas) is formed. The cooling gas cg is a gas that functions as a shielding gas that shields the plasma PL from the external air while cooling the torch main body 24a.

In particular, the cooling gas supply channel 24c is formed of a material such as quartz, etc., and is formed to have a tubular shape that covers substantially entire surface of the torch main body 24a in the circumferential direction while ensuring a space through which the cooling gas cg flows between the cooling gas supply channel 24c and the outer circumferential surface of the torch main body 24a. With such a configuration, because the cooling gas cg flows downward in the vertical direction so as to surround the torch main body 24a and the sample capillary 24b provided inside the torch main body 24a from the outer circumference, a cooling function for the torch main body 24a and the sample capillary 24b is achieved. Furthermore, a lower end of the cooling gas supply channel 24c extends downward beyond the lower end of the torch main body 24a in the vertical direction. Thus, the cooling gas cg flows so as to surround the surrounding of the plasma PL, and therefore, the function of shielding the plasma PL from the external air is suitably realized.

An amount of the cooling gas cg introduced to the cooling gas supply channel 24c can be set arbitrarily by taking a balance with respect to the amount of the career gas cag depending on the state of the plasma PL. For example, the volumetric flow rate of the cooling gas cg can be set so as to fall within a range from 12 to 15 liter/min. In addition, as the cooling gas cg, it is preferable to use the inert gas having a low reactivity from the view point of avoiding the inhibition of the stable generation of the plasma PL while achieving the function of cooling the torch main body 24a and the function of shielding the plasma PL, and it is particularly preferable to use the argon gas.

Furthermore, at a position close to a lower end of the plasma torch 24, the coil 22 described above is wound around an outer circumference of the cooling gas supply channel 24c. By receiving a supply of AC electrical power from a power supply device (not shown), the coil 22 generates the magnetic field for generating the plasma PL. The plasma PL is generated by the action of the magnetic field. By appropriately adjusting a frequency, an amplitude, and so forth of the AC electrical power supplied to the coil 22, the state of the plasma PL can be adjusted appropriately.

Next, referring back to FIG. 1, the configurations of the sample feed control device 14 and the plasma measuring unit 16 will be described. The sample feed control device 14 controls the feed of the sample drop $S_d$ by the droplet device 12. The sample feed control device 14 of this embodiment is formed by a droplet controller 30 and a pulse generator 32.

The droplet controller 30 controls an introducing timing of the sample drop $S_d$ by the droplet head 20 (the opening and closing cycle $\Delta T_f$ of the opening and closing mechanism 20a). More specifically, the droplet controller 30 adjusts the applied voltage such that the opening and closing mechanism 20a is opened/closed at the opening and closing cycle $\Delta T_f$ that is defined by a synchronizing signal generated by the pulse generator 32.

The pulse generator 32 generates the synchronizing signal for synchronizing the feeding timing of the sample drop $S_d$ from the droplet device 12 with detection time t of light emission from the plasma PL on the basis of a detection unit time $\Delta T_u$ that depends on a frame rate of a high speed camera 38, which will be described below, and the pulse generator 32 outputs the synchronizing signal to the droplet controller 30. In a case in which a simplification of the configuration is required for a compromised analysis application, etc., instead of a measuring accuracy, the pulse generator 32 may be omitted appropriately.

The plasma measuring unit 16 is provided with a quartz lens 33, a spectrometer 34, an imaging intensifier 36 serving as a detection device, the high speed camera 38, and an analyzer 39.

The quartz lens 33 focuses the light emitted from the plasma PL to the spectrometer 34. In particular, the quartz lens 33 is configured so as to focus the light emitted from the plasma PL in a region from a measurement start point $P_{O0}$ to a measurement end point $P_{O2}$ (hereinafter, also simply referred to as "a measurement region MA") to the spectrometer 34.

The spectrometer 34 resolves the light focused by the quartz lens 33 into the light with each wavelength component $\lambda_N$ (N=1, 2, 3, etc.). More specifically, the spectrometer 34 images the light focused by the quartz lens 33 such that the wavelength components $\lambda_1, \lambda_2, \lambda_3$, etc. are aligned along the Y axis direction. The spectrometer 34 is formed of a diffraction grating depending on a wavelength resolving power required, for example. It is preferable that the wavelength resolving power of the spectrometer 34 be in $1/100$ nm order, for example, equal to or lower than 0.04 nm.

The imaging intensifier 36 amplifies the light resolved by the spectrometer 34 and generates a spatial distribution of the light. More specifically, the imaging intensifier 36 detects the light resolved by the spectrometer 34 as a two-dimensional image associated with the spatial distribution in the measurement region MA (the position in the vertical direction and the position in the horizontal direction).

The high speed camera 38 continuously acquires the two-dimensional images detected by the imaging intensifier 36 at the frame rate that is set in advance (for example, several tens of thousands to several millions fps) and generates a time series image group $I_m$ (t) containing a time-spatial light spectrum $I_d$ (t, X, Y), which will be described later, as information. The high speed camera 38 stores the time series image group $I_m$ (t) in a predetermined storage region as digital image data. In other words, in this embodiment, the detection unit time $\Delta T_u$ (for example, several hundreds ns to several hundreds μs) is set in accordance with the frame rate set for the high speed camera 38.

Especially, in this embodiment, it is preferable that the frame rate of the high speed camera 38 be set such that the detection unit time $\Delta T_u$ is sufficiently shorter than the opening and closing cycle $\Delta T_f$ of the opening and closing mechanism 20a. In other words, the frame rate of the high speed camera 38 is set such that, during a course of excitation of a single drop of the sample drop $S_d$ fed from the droplet device 12 moving in the measurement region MA, the image acquisition can be performed for a plurality of times during the course of the excitation. More specifically, in order to enable acquisition of the images of several frames to several thousands frames during the course of the excitation, it is preferable that the frame rate be set such that the detection unit time $\Delta T_u$ is about $1/100$ to $1/100000$ of the opening and closing cycle $\Delta T_f$.

Next, generation of the time series image group $I_m$ (t) by the imaging intensifier 36 and the high speed camera 38 will be described in more detail.

Figure 3:
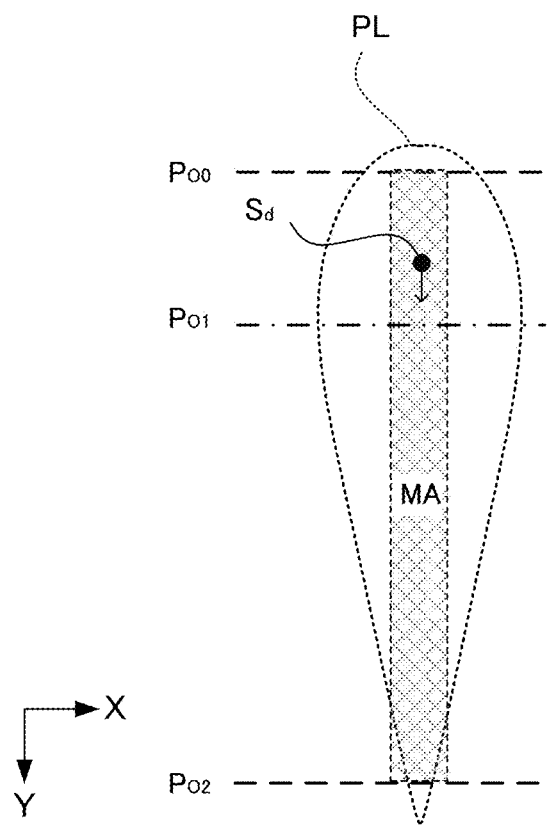
FIG. 3 is a diagram for explaining a measurement region set for plasma.

FIG. 3 is a diagram schematically showing the measurement region MA that is set in the plasma PL in this embodiment. As shown in the figure, the measurement region MA is set as a region having a width in the horizontal direction and a length in the vertical direction that are arbitrarily set between the measurement start point $P_{O0}$ and the measurement end point $P_{O2}$ in the plasma PL. FIG. 3 shows, for reference, an emission start point $_{O1}$ that is the position in the vertical direction at which the excitation (the light emission) of the sample drop $S_d$ moving downward in the substantially vertical direction starts.

In this embodiment, the imaging intensifier 36 can detect, in the measurement region MA, a state of the light based on the spatial distribution consisting of positions in the vertical direction along which the sample drop $S_d$ moves (the position Y in the vertical direction) and positions assigned to the respective wavelength components $\lambda_N$ in accordance with the resolution of the spectrometer 34 (the position X in the horizontal direction).

Figure 4:
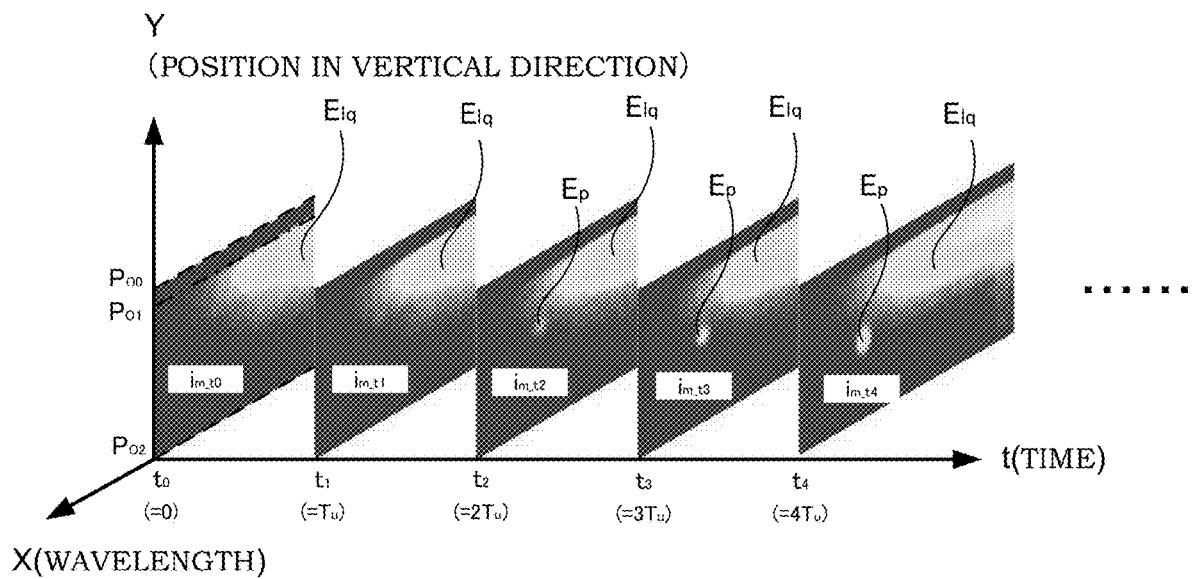
FIG. 4 is a diagram showing an example of an aspect of a time series image group generated by a high speed camera.

FIG. 4 is a diagram showing an example of an aspect of the time series image group $I_m$ (t) generated by the high speed camera 38.

In this embodiment, the time series image group $I_m$ (t) consisting of a plurality of time series images $i_{m\_t}$ at every detection unit time $\Delta T_u$ (five time series images $i_{m\_t0}$ to $i_{m\_t4}$ in FIGS. 4A and 4B) is generated by the high speed camera 38.

In other words, it is possible to assign detection timings (the detection times t) to the respective time series images $i_{m\_t}$ acquired at every detection unit time $\Delta T_u$ in the generated order (in the chronological order). In addition, the image coordinate of the time series image group $I_m$ (t) in the longitudinal direction corresponds to the position Y in the vertical direction described above that is the moving path of the sample drop $S_d$ (the moving path of the particles p) in the measurement region MA, and the image coordinate of the time series image group $I_m$ (t) in the lateral direction corresponds to the position X in the horizontal direction described above associated with the wavelength component $\lambda_N$. Therefore, in the following, the image coordinates of the time series image group $I_m$ (t) are expressed by reference signs (X, Y) in a similar manner to the vertical direction (the Y axis direction) and the horizontal direction (the X axis direction) in the measurement region MA.

As shown in FIG. 4, the time series image group $I_m$ (t) includes excitation light $E_{lq}$ derived from a liquid lq forming the sample drop $S_d$ and excitation light $E_p$ derived from the particles p. Especially, in the example shown in FIG. 4, the excitation light $E_p$ of the particles p that are a detection target is appeared from the time series image $i_{m\_t2}$ in the detection time $t=t_2$. The form of the excitation light $E_p$ is changed in the time series image $i_{m\_t3}$ and the time series image $i_{m\_t4}$ at the detection time $t=t_3$ and $t_4$ after the time series image $i_{m\_t2}$.

The present inventors focused on this point and found that the change in the form of the excitation light $E_p$ of the particles p in the respective time series images $i_{m\_t}$ correlates with properties related to the particles p contained in the liquid sample S other than the composition (i.e., a particle size, a particle shape, a particle structure, and so forth). In other words, the present inventors reached an idea that by extracting a feature amount FV that correlates with the property (hereinafter, simply also referred to as "a sample characteristic Ch") related to the particles p contained in the liquid sample S other than the composition from the above-described time series image group $I_m$ (t), it is possible to analyze the characteristic of the liquid sample S that was not analyzable by the existing ICP emission spectrophotometric analysis.

Furthermore, the present inventors found that it is preferred that the opening and closing cycle $\Delta T_f$ of the opening and closing mechanism 20a be adjusted in accordance with the particle concentration $Co_p$ of the liquid sample S such that the excitation light $E_p$ of the particles p that are the measurement target is contained in the time series image group $I_m$ (t) more reliably.

More specifically, in a case in which the particle concentration $Co_p$ of the liquid sample S is relatively high, it is assumed that the high speed camera 38 can capture the particles p in the sample drop $S_d$ moving in the measurement region MA at a higher probability. Therefore, the excitation light $E_p$ derived from the particles p is more likely to be contained in the time series image group $I_m$ (t). On the other hand, in a case in which the particle concentration $Co_p$ of the liquid sample S is relatively low, the excitation light $E_p$ derived from the particles p is less likely to be contained in the time series image group $I_m$ (t) for the opposite reason.

Thus, in this embodiment, from the viewpoint of further improving an accuracy of computing the feature amount FV for specifying the sample characteristic Ch, the opening and closing cycle $\Delta T_f$ of the opening and closing mechanism 20a is adjusted in accordance with the particle concentration $Co_p$ of the liquid sample S. More specifically, the lower the particle concentration $Co_p$ is, the shorter the opening and closing cycle $\Delta T_f$ is set such that the drop diameter $r_d$ of the sample drop $S_d$ is to be increased and the particles p are to be contained in single sample drop $S_d$ at a higher probability.

In addition, in a case in which a plurality of kinds of particles p with different characteristics, such as the composition, the particle size, the particle shape, the particle structure, and so forth, from each other are contained in the sample drop $S_d$, in other words, in a case in which the particle concentration $Co_p$ is relatively high, it is assumed that the excitation lights $E_p$ of the particles p with different characteristics are superimposed in the respective time series images $i_{m\_t}$. Therefore, in this case, from the viewpoint of suppressing the superimposition of the excitation lights $E_p$, in order to reduce the number of the particles p to be contained in the single sample drop $S_d$, the opening and closing cycle $\Delta T_f$ is set so as to be relatively short. The particle size in this embodiment means the particle diameter of the particles p. Especially, the particle size corresponds to, given that the particles p have a spherical shape, the particle diameter that is defined on the basis of the diameter and the number of atoms in accordance with the composition forming the sphere (the kind of the atom). In addition, instead, the particle size may be the particle diameter that is set by a comparison with the measurement using a predetermined standard particle.

Next, the configuration of the analyzer 39 of the plasma measuring unit 16 will be described. The analyzer 39 of this embodiment is configured of a computer provided with: a computing/control device such as a CPU (Central Processing Unit), etc.; a various storage device such as a RAM (Random Access Memory), a ROM (Read Only Memory), an SSD (Solid State Drive), a hard disc (a magnetic storage device), or the like; and a various input/output device such as a keyboard, a mouse, a touch panel, a display, a printer, an I/O port, and so forth. The function described in FIG. 5 below is then realized by the above-described respective hardware and a program (a software) stored in the storage device.

Figure 5:
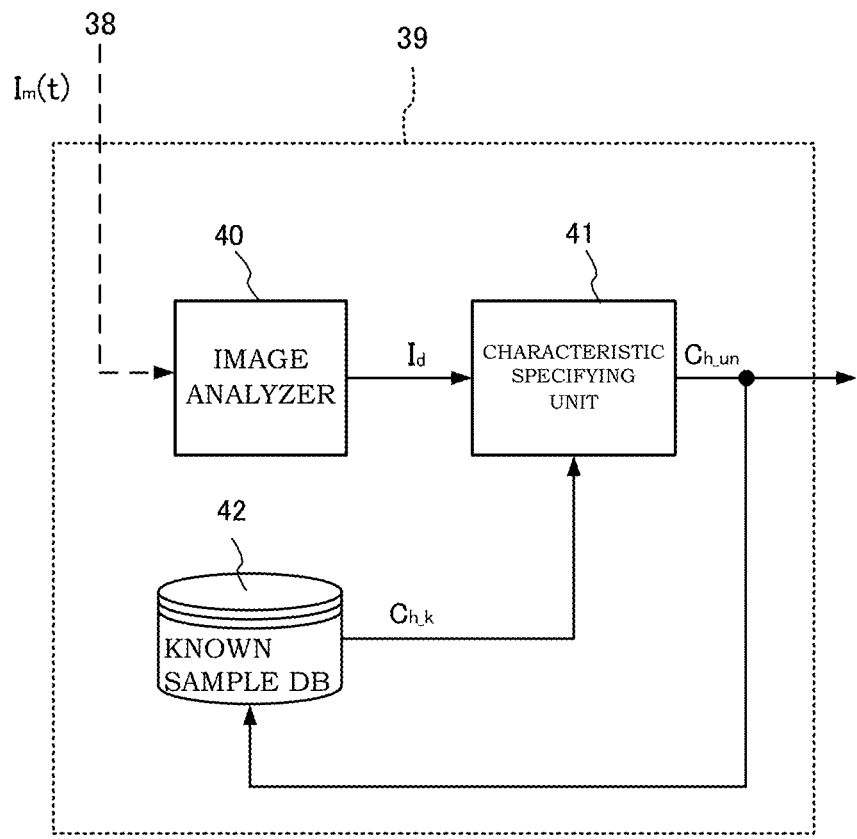
FIG. 5 is a block diagram for explaining a configuration of an analyzer.

FIG. 5 is a block diagram for explaining the configuration (the function) of the analyzer 39. As shown in the figure, the analyzer 39 is provided with an image analyzer 40, a characteristic specifying unit 41, and a known sample DB42.

From the viewpoint of obtaining the feature amount FV that correlates with the above-described sample characteristic Ch, the image analyzer 40 analyzes the time series image group $I_m$ (t) generated by the high speed camera 38.

Especially, the image analyzer 40 of this embodiment computes, from the time series image group $I_m$ (t), the time-spatial light spectrum $I_d$ (t, X, Y) for which: the image coordinate X corresponding to the wavelength component $\lambda_N$ of the light contained in the respective time series images $i_{m\_t}$ forming the time series image group $I_m$ (t); the image coordinate Y corresponding to the position of the sample drop $S_d$ in the measurement region MA; and the detection time t corresponding to the respective time series images $i_{m\_t}$ are set as variables. More specifically, the image analyzer 40 performs the computation to obtain the time-spatial light spectrum $I_d$ (t, X, Y) containing the intensity (a signal intensity of image pixels corresponding to the excitation light E) of the excitation light E derived from the sample drop $S_d$ contained in the respective time series images $i_{m\_t}$.

Furthermore, the image analyzer 40 of this embodiment appropriately computes, depending on necessity, a time/wavelength optical spectrum $I_{d1}$ (t, X) obtained by integrating the time-spatial light spectrum $I_d$ (t, X, Y) in an arbitrary range in the image coordinate Y, a time/position optical spectrum $I_{d2}$ (t, Y) obtained by integrating the time-spatial light spectrum $I_d$ (t, X, Y) in an arbitrary range of the image coordinate X, and a time optical spectrum $I_{d3}$ (t) obtained by integrating the time-spatial light spectrum $I_d$ (t, X, Y) in arbitrary ranges of both of the image coordinate Y and the image coordinate X.

In the above, it is preferred that the integrating range of the image coordinate Y for performing the computation of the time/wavelength optical spectrum $I_{d1}$ (t, X) be appropriately set such that the intensity signal of the excitation light E is suitably contained in the time/wavelength optical spectrum $I_{d1}$ (t, X). More specifically, it is preferred that a region (a region with a high S/N ratio), in which an influence of a noise light intensity component (backlight, etc. on a background) contained in the respective time series images $i_{m\_t}$ may be reduced comparatively, be set as the integrating range of the image coordinate Y.

In addition, it is preferred that the integrating range of the image coordinate X for performing the computation of the time/position optical spectrum $I_{d2}$ (t, Y) be set as a range that depends on the wavelength region corresponding to the elements forming the sample drop $S_d$ (especially, the particles p contained in the sample drop $S_d$). In a case in which the elements forming the sample drop $S_d$ are unknown, the elements may be specified by using an conventional analysis method in advance and the wavelength region corresponding thereto may be set as the integrating range, or a region obtained by adding respective wavelength regions corresponding to several element candidates that may be assumed may be set as the integrating range.

The characteristic specifying unit 41 computes the above-described feature amount FV on the basis of the time-spatial light spectrum $I_d$ (t, X, Y) computed by the image analyzer 40.

In the above, the feature amount FV in this embodiment is a univariate or multi-variate parameter forming the time series image group $I_m$ (t) or the time-spatial light spectrum $I_d$ (t, X, Y) and is a parameter that uniquely correlates with the sample characteristic Ch (the composition, the particle size, the particle shape, the particle structure, and so forth) of the liquid sample S.

An example of the computation of the feature amount FV will be described in detail.

Figure 6:
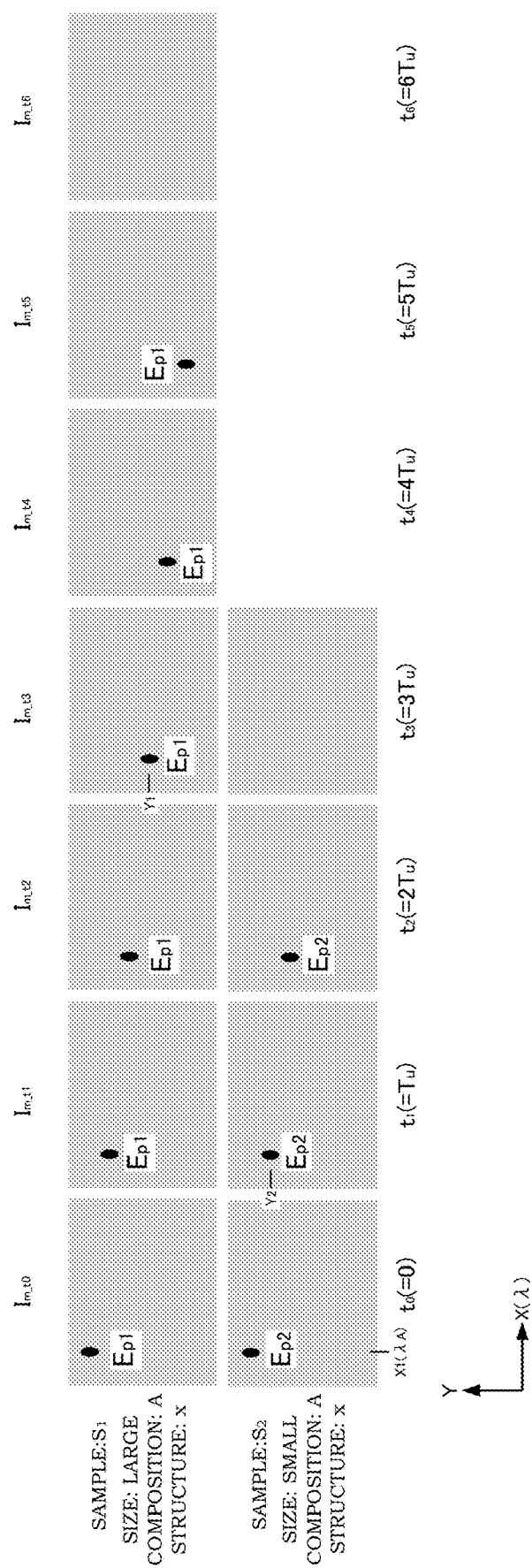
FIG. 6 is a diagram for explaining a method of computing a feature amount that correlates with a particle size.

FIG. 6 is a diagram for explaining a method of computing the feature amount FV that correlates with the particle size as the sample characteristic Ch.

Specifically, FIG. 6 shows the time series image group $I_m$ (t) that is acquired for the liquid sample $S_1$ and the liquid sample $S_2$ respectively containing two kinds of particles, the particles $p_1$ and the particles $p_2$, that are formed to have the same composition (element A) and the same particle structure (structure x), but have different particle sizes (different particle diameters). Especially, in FIG. 6, the time series image group $I_m$ (t) for each of the particles $p_1$ and the particles $p_2$ is assumed in a case in which the particle size for the particles $p_1$ is larger than the particle size for the particles $p_2$.

In addition, FIG. 6 shows an example in which the time series image group $I_m$ (t) contains seven time series images $i_{m\_t0}$ to $i_{m\_t6}$ that are respectively acquired at the detection time $t_0$ to $t_7$ with the detection unit time $\Delta T_u$ intervals.

As shown in the figure, in the time series image group $I_m$(t) of the liquid sample $S_1$ containing the particles $p_1$ with relatively larger particle size, in the respective time series images $i_{m\_t0}$ to $i_{m\_t5}$ for the detection time $t_0$ to $t_5$, the excitation light $E_{p1}$ for the particles $p_1$ appears in the vicinity of a specific image coordinate $X_1$ (in other words, a wavelength component $\lambda_A$). Furthermore, the intensity of the excitation light $E_{p1}$ is increased during a course of the detection time $t_0$ to $t_3$, peaked at the detection time $t_3$, reduced during a course of the detection time $t_3$ to $t_5$, and almost disappeared at the detection time to.

On the other hand, in the time series image group $I_m$ (t) of the liquid sample $S_2$ containing the particles $p_2$ with relatively smaller particle size, in the respective time series images $i_{m\_t0}$ to $i_{m\_t5}$ for the detection time $t_0$ to $t_3$, the excitation light $E_{p2}$ of the particles $p_2$ appears in the vicinity of the wavelength component $\lambda_1$ that is the same as the case for the liquid sample $S_1$. Furthermore, the peak of the intensity of the excitation light $E_{p2}$ is increased during a course of the detection time $t_0$ to $t_1$, peaked at the detection time $t_1$, reduced during a course of the detection time $t_1$ to $t_2$, and almost disappeared at the detection time $t_3$.

Therefore, in a case of the particles $p_1$ and the particles $p_2$, which are formed to have the same element and the same structure with each other, although the respective excitation light $E_p i$ and $E_{p2}$ appear at the common wavelength component, the respective intensities reach respective peaks at different detection time t and image coordinate Y.

More specifically, the detection time $t_1$, at which the intensity of the excitation light $E_{p2}$ reaches the peak for the particles $p_2$ with relatively smaller particle size, is earlier than the detection time $t_3$ at which the intensity of the excitation light $E_{p1}$ reaches the peak for the particles $p_1$ with relatively larger particle size. In addition, the image coordinate $Y_1$ at which the excitation light $E_{p2}$ of the relatively smaller particles $p_2$ reaches the peak intensity is smaller relative to the image coordinate $Y_2$ at which the excitation light $E_p i$ of the relatively larger particles $p_1$ reaches the peak intensity. It can be thought that this is because the smaller the particle size is, the faster the progression of the excitation becomes after the particles $p_1$ reach the plasma PL. Therefore, by finding the peak intensity of the excitation light E and the detection time t and the image coordinate Y when the peak intensity is achieved (the position of the sample drop $S_d$ in the measurement region MA), it is possible to estimate the particle size. In other words, in this embodiment, the peak intensity of the excitation light E, and the detection time t and the image coordinate Y when the peak intensity is achieved are the feature amount FV that correlate with the particle size.

Especially, in this case, because the particles $p_1$ and the particles $p_2$ have mutually common composition, by using the time/position optical spectrum $I_{d2}$ (t, Y) or the time optical spectrum $I_{d3}$ (t) in which the wavelength component $\lambda$ (the image coordinate X) is not used as the variable, the computation of the feature amount FV is simplified.

Next, a method of computing the feature amount FV that correlates with the particle structure as the sample characteristic Ch will be described.

Figure 7:
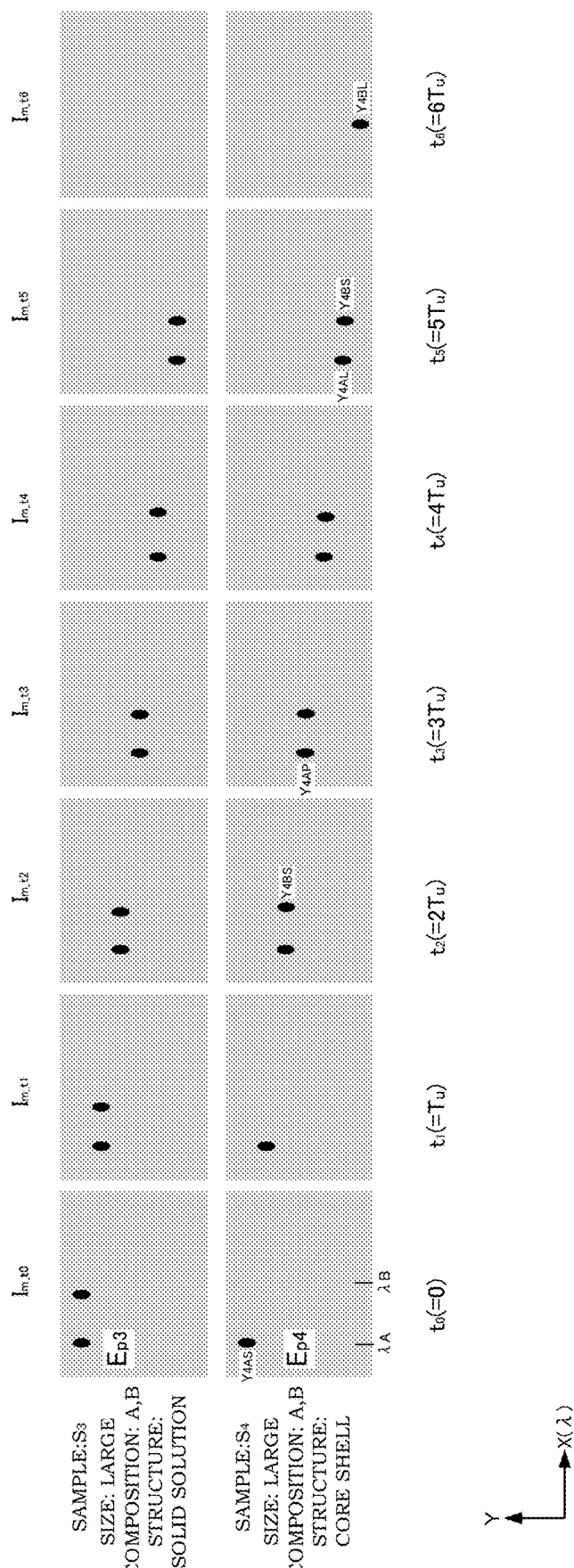
FIG. 7 is a diagram for explaining a method of computing the feature amount that correlates with a particle structure.

FIG. 7 is a diagram for explaining the method of computing the feature amount FV that correlates with the particle structure.

Specifically, FIG. 7 shows the time series image group $I_m$ (t) images of which are respectively acquired for the liquid sample $S_3$ containing the particles $p_3$ and the liquid sample $S_4$ containing the particles $p_4$.

Especially, the particles $p_3$ contained in the liquid sample $S_3$ have a structure that is formed of two kinds of elements A and B that are combined together as the solid solution. More specifically, the particles $p_3$ have a structure in which the element A and the element B are combined together by an intimate mixing. In addition, the particles $p_4$ contained in the liquid sample $S_4$ are formed of the same two kinds of elements A and B as the particles $p_3$, and in this structure, these elements are combined together in a form of a so-called core shell structure. More specifically, the particles $p_4$ have a structure in which a core formed of a portion formed of the element B and an outer shell encapsulating the core formed of a portion formed of the element A are combined together. The particle size of the particles $p_3$ and the particle size of the particles $p_4$ are substantially the same with each other.

As shown in the figure, because the particles $p_3$ are formed of the two kinds of elements A and B, the peak intensities for the excitation light $E_{p3}$ derived from the particles $p_3$ respectively appear in the vicinity of the wavelength component $\lambda_A$ corresponding to the element A and in the vicinity of a wavelength component $\lambda_B$ corresponding to the element B. In addition, similarly, the peak intensities for the excitation light $E_{p4}$ derived from the particles $p_4$ formed of the two kinds of elements A and B also respectively appear in the vicinity of the wavelength component $\lambda_A$ and in the vicinity of the wavelength component $\lambda_B$.

On the other hand, with the particles $p_3$ having the solid solution structure, the courses of the change in the excitation light $E_{p3}$ for the wavelength component $\lambda_A$ and the wavelength component $\lambda_B$ per the detection time t and the image coordinate Y substantially agree with each other.

In contrast, in the particles $p_4$ having the core shell structure, the intensity having the wavelength component $\lambda_A$ derived from the element A forming the outer shell starts to appear first (the detection time $t_0$ and the image coordinate $Y_{4AS}$). On the other hand, the intensity having the wavelength component $\lambda_B$ derived from the element B forming the core starts to appear at the image coordinate $Y_{4B}$ that is smaller than the image coordinate $Y_{4A}$ (the detection time $t_2$ and the image coordinate $Y_{4BS}$) after the detection time $t_0$.

In addition, the intensity derived from the element A forming the outer shell reaches the peak at the detection time $t_3$ and the image coordinate $Y_{4AP}$. In contrast, the intensity derived from the element B forming the core reaches the peak at later time at the detection time $t_5$ and the image coordinate $Y_{4BP}$.

Furthermore, the intensity derived from the element A forming the outer shell is not detected after being detected the last at the detection time $t_5$ and the image coordinate $Y_{4AL}$. In contrast, the intensity derived from the element B forming the core is still detected at the later detection time $t_6$ and the image coordinate $Y_{4BL}$.

For this phenomenon, the present inventors assume that this is because, because the element A forming the outer shell is exposed to the plasma PL at earlier timing than the element B forming the core, the progression of the excitation thereof is caused relatively earlier.

Therefore, the time series image group $I_m$ (t) shown in FIG. 7 contains, for the particles p formed of at least two kinds of elements, information capable of specifying a combined aspect (in other words, the structure) for these elements. More specifically, the peak intensities of the excitation light E contained in the time series image group $I_m$ (t) or the time-spatial light spectrum $I_d$ (t, X, Y), the detection time t and the image coordinate Y at which each peak intensity is reached form the feature amount FV capable of specifying the particle structure.

Referring back to FIG. 5, the known sample DB42 is a database that stores the sample characteristic Ch (a known characteristic $Ch_{\_k}$) related to a known sample $S_{\_k}$ by linking it with a time-spatial light spectrum $I_{d\_k}$ (t, X, Y) serving as the feature amount $FV_{\_k}$ computed for the known sample $S_{\_k}$. The feature amount $FV_{\_k}$ related to the known particles $p_{\_k}$ can also be computed by a method similar to the method described above.

Next, an example of an arithmetic algorithm in the characteristic specifying unit 41 following the computation aspect of the above-described feature amount FV will be described. For example, the characteristic specifying unit 41 can specify the sample characteristic Ch of the liquid sample S by executing following respective Steps (I) to (III).

Step (I): the region (the region defined by the position Y in the vertical direction and the detection time t) for the peak intensity of the excitation light $E_p$ of the particles p contained in the liquid sample S (hereinafter, also referred to as "a first peak intensity") is computed as the feature amount FV from the time/position optical spectrum $I_{d2}$ (t, Y) computed by the image analyzer 40. Specifically, in the time/position optical spectrum $I_{d2}$ (t, Y), a region obtained by removing the region, to which influence caused due to the excitation light $E_{lq}$ derived from the liquid, contamination, and so forth examined by experiments, etc. in advance is reflected, is extracted as the region for the first peak intensity corresponding to the excitation light $E_p$.

Step (II): By referring to the known sample DB42, the data of the known particles $p_{\_k}$ whose region for the first peak intensity corresponding to the excitation light $E_p$ is matched is extracted.

Step (III): the known characteristic $Ch_{\_k}$ contained in the data of the extracted known particles $p_{\_k}$ is specified as the sample characteristic Ch of the liquid sample S. By doing so, the sample characteristic Ch of the liquid sample S (the composition, the particle size, the particle shape, the particle structure, and so forth) is specified.

Steps (I) to (III) described above are only examples of the algorithm for specifying the sample characteristic Ch of the liquid sample S, and a specific aspect of the algorithm is not limited to the above-described examples.

In addition, the sample characteristic Ch of the liquid sample S specified by the characteristic specifying unit 41 is appropriately stored for the known sample DB42 by linking it with the region for the first peak intensity computed as the feature amount FV, and this may be output to an arbitrary output device (the display, etc.) (not shown).

The configuration and the operational advantages of the sample analysis system 10 according to this embodiment described above will be collectively described below.

The sample analysis system 10 of this embodiment has: the droplet device 12 configured to intermittently introduce the sample (the liquid sample S) to the measurement region MA set in the plasma PL; a light emission detection device (the imaging intensifier 36 and the high speed camera 38) configured to detect the light emission caused in the measurement region MA at the detection time (t=$t_0$, $t_1$, $t_2$, etc.) serving as the detection timing, the detection timing being set at a predetermined cycle (the detection unit time $\Delta T_u$) in advance; and the analyzer 39 serving as an analysis device configured to analyze the sample drop $S_d$ based on the detected light emission.

The analyzer 39 is provided with: a distribution computing unit (the image analyzer 40) configured to compute a time-spatial light intensity distribution (the time series image group $I_m$ (t) or the time-spatial light spectrum $I_d$ (t, X, Y)),
the time-spatial light intensity distribution being a distribution in which each of the detection time t, the position in the measurement region MA (the image coordinate Y), and the wavelength component $\lambda_N$ (the image coordinate X) of the light emission is set as a variable; and the characteristic specifying unit 41 configured to compute, from the time-spatial light intensity distribution, the feature amount FV that correlates with the sample characteristic Ch indicating the property of the sample drop $S_d$ and specify the sample characteristic Ch based on the feature amount FV.

By doing so, it is possible to obtain, from the above-described time-spatial light intensity distribution, the feature amount FV that correlates with the information indicating the sample characteristic Ch other than the composition, which was not contained in the emission spectrum (the emission intensity distribution according to the wavelength component) in the conventional ICP emission spectrophotometric analysis, and it is possible to specify the sample characteristic Ch from the feature amount FV. In other words, it becomes possible to analyze the property other than the composition (the element) of the liquid sample S, which had been difficult to perform the analysis by the conventional ICP emission spectrophotometric analysis.

Especially, the sample characteristic Ch that is an analysis target as described above includes the element of the particles p forming the liquid sample S; and at least one of the particle size and the particle structure.

With such a configuration, it is possible to apply the sample analysis system 10 to applications for analyzing the property of the particles p contained in a specific product in various field. Especially, with the sample analysis system 10 of this embodiment, it is possible to execute the analysis of the particles p while keeping the form of the liquid sample S without executing a processing for separating the particles p, etc. for the liquid sample S. Therefore, it is possible to execute the analysis without performing complicated processings.

In addition, the sample in this embodiment is the liquid sample S formed by mixing the particles p with a predetermined liquid. The droplet device 12 is provided with the opening and closing mechanism 20a configured to open and close the injection port such that the liquid sample S is introduced into the plasma PL in a form of the drop (the sample drop $S_d$) with a desired diameter. The analyzer 39 is configured to adjust the opening and closing cycle $\Delta T_f$ in the opening and closing mechanism 20a on the basis of the concentration (the particle concentration $Co_p$) of the particles p contained in the liquid sample S.

With such a configuration, from the viewpoint of increasing the analysis accuracy, it is possible to suitably control the number of the particles p contained in the single sample drop $S_d$ according to the level of the particle concentration $Co_p$.

In addition, the characteristic specifying unit 41 is configured to compute, as the feature amount FV, the first peak intensity, the detection timing (the detection time t) at the first peak intensity, and the position in the measurement region (the image coordinate Y) at the first peak intensity, the first peak intensity being the peak intensity in a case in which the time-spatial light spectrum $I_d$ (t, X, Y) serving as the time-spatial light intensity distribution is integrated in the wavelength component $\lambda_N$ (the image coordinate X) (the time/position optical spectrum $I_{d2}$ (t, Y)). The characteristic specifying unit 41 is configured to specify the particle size on the basis of the feature amount FV.

With such a configuration, a more specific aspect for specifying the particle size, which is one of the sample characteristics Ch, from the time-spatial light spectrum $I_d$ (t, X, Y) is realized.

Furthermore, the sample characteristic Ch includes the particle structure that is a form in which one or more kinds of element forming the particles p are combined. The characteristic specifying unit 41 is configured to further specify the particle structure on the basis of the feature amount FV as the peak intensity in the time/position optical spectrum $I_{d2}$ (t, Y) and the detection time t at the peak intensity.

With such a configuration, a more specific aspect for specifying the particle structure for the particles p, which is one of the sample characteristic Ch, from the time-spatial light spectrum $I_d$ (t, X, Y) is realized.

In addition, in this embodiment, the sample analysis method is provided, the sample analysis method including: a step of intermittently introducing the sample (the sample drop $S_d$) to the measurement region MA set in the plasma PL; a step of detecting the light emission caused in the measurement region MA at the detection time (t=$t_0$, $t_1$, $t_2$, etc.) that is the detection timing set at the predetermined cycle (the detection unit time $\Delta T_u$) in advance; a step of computing the detection time t, the position in the measurement region MA (the image coordinate Y), and the time-spatial light intensity distribution (the time series image group $I_m$ (t) or the time-spatial light spectrum $I_d$ (t, X, Y)), the time-spatial light intensity distribution being the distribution in which the wavelength component $\lambda_N$ (the image coordinate X) of the light emission is set as the variable; a step of computing, from the time-spatial light intensity distribution, the feature amount FV that correlates with the sample characteristic Ch indicating the property of the sample drop $S_d$; and a step of specifying the sample characteristic Ch on the basis of the feature amount FV.

By doing so, it is possible to obtain, from the above-described time-spatial light intensity distribution, the feature amount FV that correlates with the information indicating the sample characteristic Ch other than the composition, which was not contained in the emission spectrum (the emission intensity distribution according to the wavelength component) in the conventional ICP emission spectrophotometric analysis, and it is possible to specify the sample characteristic Ch from the feature amount FV. In other words, the analysis method that makes it possible to analyze the property other than the composition (the element) of the liquid sample S, which had been difficult to perform the analysis by the conventional ICP emission spectrophotometric analysis, is realized.

Second Embodiment

In the following, a second embodiment will be described. In this embodiment, an example in which, as the sample characteristic Ch of the liquid sample S, a particle-size distribution $P_d$ of the particles p contained in the liquid sample S is specified will be described. Especially, in this embodiment, an example in which an abundance ratio of each of a plurality of kinds of particles present is specified as the particle-size distribution $P_d$ in a case in which the liquid sample S contains the plurality of kinds of particles $p_1, p_2, p_3 \ldots p_m$ having the composition in common but having the particle diameters different from each other will be described. Especially, the particle-size distribution $P_d$ in this embodiment means a distribution of the number of particles of the particles $p_1, p_2, p_3 \ldots p_m$ having the respective particle diameters contained in the liquid sample S or a distribution of the respective particle concentrations $Co_{p1}, Co_{p2}, CO_{p3} \ldots Co_{pm}$ of the particles $p_1, p_2, p_3 \ldots p_m$ contained in the liquid sample S.

Specifically, the characteristic specifying unit 41 in this embodiment specifies the particle-size distribution $P_d$ by following the respective Steps described below.

Step (I): The time/position optical spectrum $I_{d2}$ (t, Y) is computed by integrating the time-spatial light spectrum $I_d$ (t, X, Y), which has been described in the first embodiment for the liquid sample S containing the particles $p_1, p_2, p_3 \ldots p_m$, in the image coordinate X. Especially, the integrating range of the image coordinate X is set to a range that corresponds to the total sum of the wavelength components $\lambda_{p1}, \lambda_{p2} \ldots \lambda_{pm}$ associated with the respective constituent elements of each of the particles $p_1, p_2, p_3 \ldots p_m$.

Step (II): Next, by integrating, in a predetermined measurement time that is set in advance by taking a feed-start timing of an arbitrary sample drop $S_d$ as a start point, the time/position optical spectrum $I_{d2}$ (t, Y) for every droplet (for every time period for the single sample drop $S_d$ to move from the measurement start point $P_{OO}$ to the measurement end point $P_{O2}$ in the measurement region MA) (integrated in the image coordinate Y), the time optical spectrum $I_{d3}$ (Dp) is obtained for each of droplet counts $Dp_1$ to $Dp_n$.

Figure 8:
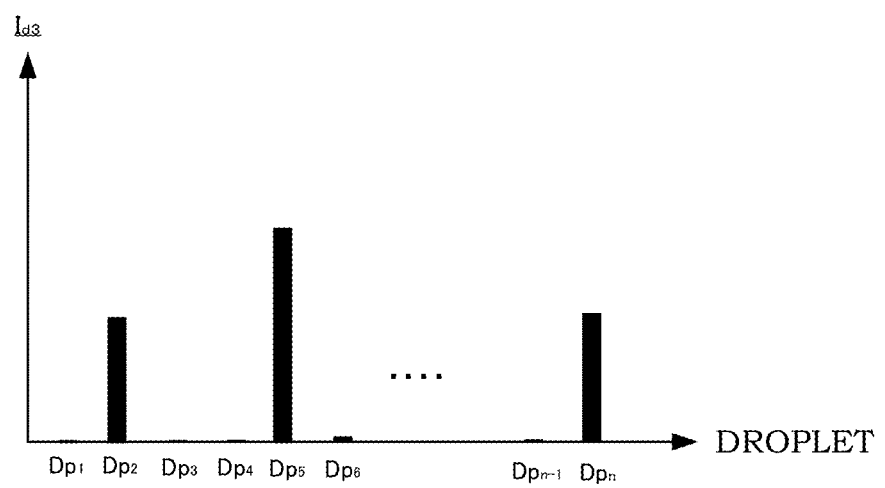
FIG. 8 is a diagram showing an example of a distribution of a time optical spectrum in each droplet count.

FIG. 8 is a diagram showing an example of the distribution of the time optical spectrum $I_{d3}$ (Dp) in each of the droplet counts $Dp_1$ to $Dp_n$. Especially, in FIG. 8, the horizontal axis indicates first to n-th droplet counts $Dp_1$ to $Dp_n$, and the vertical axis indicates the time optical spectrum $I_{d3}$ (Dp) for each of the droplet counts $Dp_1$ to $Dp_n$.

As shown in FIG. 8, in the time optical spectrum $I_{d3}$ (Dp) for each of the droplet counts $Dp_1$ to $Dp_n$, values for particular droplets (in FIG. 8, $Dp_2$, $Dp_5$, and $Dp_n$) are larger than others. In other words, the droplet counts $Dp_2$, $Dp_5$, and $Dp_n$ respectively contain the intensity components from the excitation light $E_p i$ to $E_{pm}$ derived from the particles $p_1$ to $p_m$, and it can be seen that the sample drops $S_d$ for the droplet counts $Dp_2$, $Dp_5$, and $Dp_n$ respectively contains the particles $p_1, p_2, p_3 \ldots p_m$.

Step (III): In order to perform the specification of the particle-size distribution $P_d$, the time optical spectrum $I_{d3}$ (Dp) of the sample drop $S_d$, in which the respectively particles $p_1$ to $p_m$ are estimated to be contained, is extracted from the time optical spectrum $I_{d3}$ (Dp) in each of the droplet counts $Dp_1$ to $Dp_n$. More specifically, the threshold value is set from the viewpoint of determining that the intensity component derived from the respectively particles $p_1$ to $p_m$ is contained, and the time optical spectrum $I_{d3}$ (Dp) exceeding the threshold value and the droplet count Dp at that time are extracted. Especially, in this embodiment, the respective time optical spectra $I_{d3}$ ($Dp_2$), $I_{d3}$ ($Dp_5$), and $I_{d3}$ ($Dp_n$) in the droplet counts $Dp_2$, $Dp_5$, and $Dp_n$ are extracted as second peak intensities. For the sake of simplification of the description, in the following, these may also respectively be described as peak values $I_{d3}$ ($Dp_2$), $I_{d3}$ ($Dp_5$), and $I_{d3}$ ($Dp_n$).

Step (IV): The particle-size distribution $P_d$ of the liquid sample S is specified by contrasting the peak values $I_{d3}$ ($Dp_2$), $I_{d3}$ ($Dp_5$), and $I_{d3}$ ($Dp_n$) in the respective extracted droplet counts $Dp_2$, $Dp_5$, and $Dp_n$ with the data of the known sample $S_k$ (the data related to the droplet count Dp and the peak value $I_{d3}$ according to the particle-size distribution $P_d$) stored in the known sample DB42.

As described above, the characteristic specifying unit 41 in this embodiment specifies the particle-size distribution $P_d$ of the liquid sample S by computing, as the feature amount FV, the time optical spectrum $I_{d3}$ (especially, the peak values $I_{d3}$ ($Dp_2$), $I_{d3}$ ($Dp_5$), and $I_{d3}$ ($Dp_n$)) serving as the time-spatial light intensity distribution and the detection timing therefor (especially, the droplet counts $Dp_2$, $Dp_5$, and $Dp_n$).

The configuration and the operational advantages of the sample analysis system 10 according to this embodiment described above will be collectively described below.

In the sample analysis system 10 of this embodiment, the sample characteristic Ch includes, in a case in which the liquid sample S contains the particles $p_1$, $p_2$, $p_3$ . . . $p_n$ respectively having the different sizes, the abundance ratio (the particle-size distribution $P_d$) for each of the particles $p_1$, $p_2$, $p_3$ . . . $p_n$. The characteristic specifying unit 41 is configured to computes, as the feature amount FV, the second peak intensity (the peak values $I_{d3}$ ($Dp_2$), $I_{d3}$ ($Dp_5$), and $I_{d3}$ ($Dp_n$)) and the detection timing (the droplet counts $Dp_2$, $Dp_5$, and $Dp_n$) at the second peak intensity, the second peak intensity being the peak intensity in a case (the time optical spectrum $I_{d3}$ (t)) in which the time-spatial light spectrum $I_d$ (t, X, Y) is integrated in the wavelength component $\lambda_N$ (the image coordinate X) and the position in the measurement region MA (the image coordinate Y). The characteristic specifying unit 41 specifies the particle-size distribution $P_d$ of the respective particles $p_1$, $p_2$, $p_3$ . . . $p_n$ on the basis of the feature amount FV.

With such a configuration, a more specific aspect for specifying the particle diameter distribution $P_d$, which is one of the sample characteristic Ch, from the time-spatial light spectrum $I_d$ (t, X, Y) is realized.

In this embodiment, a description has been given of an example in which the particle-size distribution $P_d$ is specified by setting, as the feature amount FV, each of the droplet counts $Dp_2$, $Dp_5$, and $Dp_n$ defining the detection timing and the peak values $I_{d3}$ ($Dp_2$), $I_{d3}$ ($Dp_5$), and $I_{d3}$ ($Dp_n$) at that time. However, the present invention is not limited thereto, and it may possible to employ a configuration in which only one of the droplet count Dp and the peak value $I_{d3}$ (Dp) defining the detection timing may be set as the feature amount FV to compute the particle-size distribution $P_d$. In other words, even if only one of these parameters are used, the information capable of specifying the particle-size distribution $P_d$ at a certain level of accuracy is contained, and so, it is possible to suitably apply it to the analysis application requiring the simplification of the computation instead of the measuring accuracy.

In addition, from the viewpoint of achieving the simplification of the computation in a similar manner, it may be possible to employ a configuration in which the particle-size distribution $P_d$ is computed by setting, as the feature amount FV, only the peak positions (the value of the image coordinate Y at which the time/position optical spectrum $I_{d2}$ forms a peak) in the measurement region MA of the excitation light $E_p i$ to $E_{pm}$ derived from the respective particles $p_1$, $p_2$, $p_3$ . . . $p_m$.

In addition, in this embodiment, a description has been given of a specification of the particle-size distribution $P_d$ for a plurality of kinds of particles $p_1$, $p_2$, $p_3$ . . . $p_m$ having the composition in common but having the particle diameters different from each other. However, the present invention is not limited thereto, and in the liquid sample S containing the particles p having different composition (and/or the particle structure) from each other, by appropriately combining the method described in the first embodiment and the method in this embodiment, it is possible to execute the analyses of the composition (and/or the particle structure) and the particle-size distribution $P_d$ of the particles p simultaneously.

Third Embodiment

In the following, a third embodiment will be described. In this embodiment, an example in which the processing performed by the characteristic specifying unit 41 described in the first embodiment or the second embodiment is realized by a so-called artificial intelligence model will be described.

Figure 9:
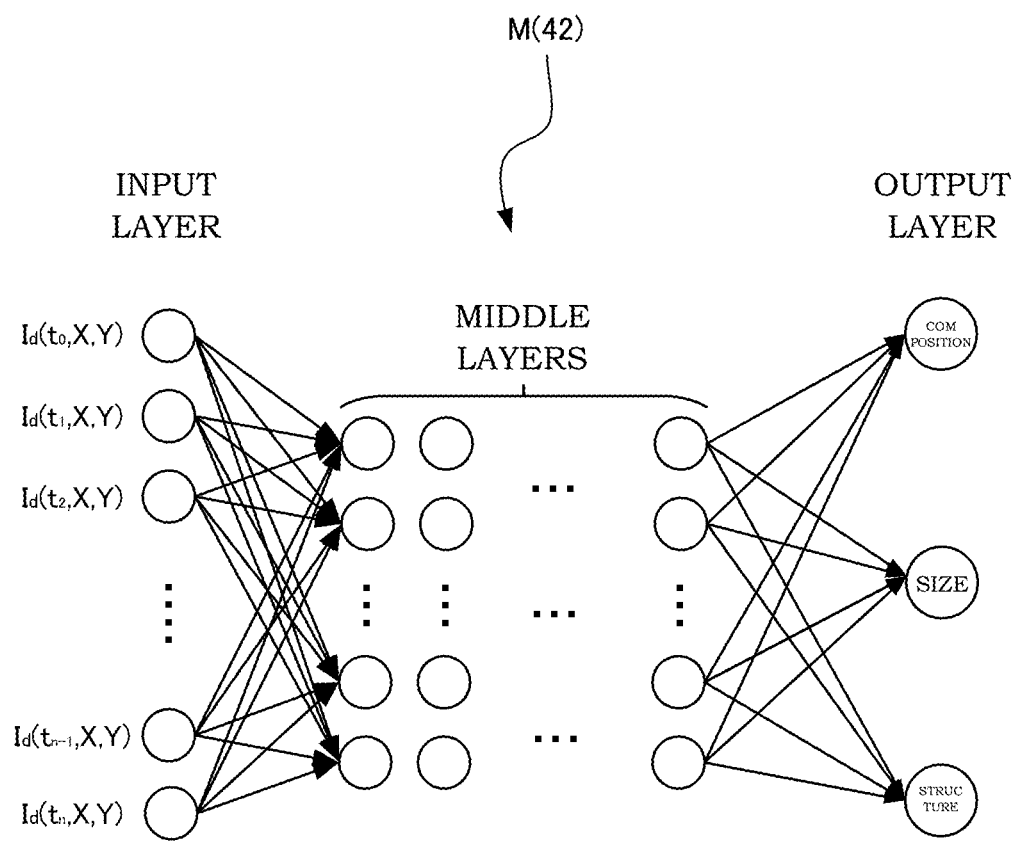
FIG. 9 is a diagram for explaining a configuration of a machine learning model that realizes a characteristic specifying unit.

FIG. 9 is a diagram for explaining a configuration of a learned model M that realizes the function of the characteristic specifying unit 41.

As shown in the figure, the characteristic specifying unit 41 in this embodiment is formed of the learned model M that uses the time-spatial light spectra $I_d$ (t, X, Y) as inputs and the sample characteristics Ch as outputs. The learned model M of this embodiment is formed of an artificial intelligence model, and especially, the learned model M is formed as a neural network consisting of an input layer, middle layers, and an output layer. More specifically, the learned model M of this embodiment is formed of a deep learning model having two or more middle layers.

In a model before performing learning, the learned model M is formed by executing a machine learning in which the time-spatial light spectrum $I_{d\_k}$ (t, X, Y) measured for the known sample $S_k$ is set in the input layer, and the known characteristic $Ch_{\_k}$ related to the known sample $S_k$ is set in the output layer.

In the above, as described in the first embodiment or the second embodiment, the time-spatial light spectrum $I_d$ contains the information (the feature amount FV) that correlates with the property (the composition, the particle size, the particle structure, and so forth) of the particles p contained in the liquid sample S.

Therefore, by implementing the learned model M obtained by the above-described machine learning in the analyzer 39, when a time-spatial light spectrum $I_{d\_un}$ (t, X, Y) for an unknown sample $S_{un}$ is set as the input, unknown characteristics $Ch_{\_u}$ that suitably match with actual characteristics for the unknown sample $S_{un}$ can be obtained as the output data.

The configuration and the operational advantages according to this embodiment described above will be collectively described below.

In the sample analysis system 10 according to this embodiment, the characteristic specifying unit 41 is formed of the learned model M, the learned model M using the time-spatial light spectrum $I_{d\_k}$ as the input (the input layer) and the sample characteristic Ch as the output (the output layer).

The learned model M is obtained by executing the machine learning in which the time-spatial light spectrum $I_{d\_k}$ (t, X, Y) related to the known sample $S_k$ is set as the input and the known characteristic $Ch_{\_k}$ indicating the property of the known sample $S_k$ is set as the output. In addition, the learned model M is configured to operate the analyzer 39 such that the time-spatial light spectrum $I_{d\_un}$ (t, X, Y) obtained for the unknown sample $S_{un}$ is set as the input and the unknown characteristic $Ch_{\_u}$ indicating the property of the unknown particles $p_{\_un}$ contained in the unknown sample $S_{un}$ is set as the output.

By doing so, it is possible to relatively simply realize the function of the characteristic specifying unit 41, in other words, the function of computing, from the time-spatial light spectrum $I_d$ (t, X, Y), the feature amount FV that correlates with the sample characteristic Ch and specifying, on the basis of the feature amount FV, the sample characteristic Ch according to the liquid sample S by utilizing the machine learning.

Especially, as described in the first embodiment, the time-spatial light spectrum $I_d$ (t, X, Y) is obtained from the time series image group $I_m$ (t) formed of great amount of time series images $i_m$ that are obtained by performing the image acquisition by the high speed camera 38 at the frame rate such as several tens of thousands to several millions fps, etc. Therefore, it is assumed that the enormous amount of computation is required for specifying the feature amount FV and the sample characteristic Ch. In addition, the sample characteristic Ch to be specified also includes a plurality of factors of the particles p, such as the composition, the particle size, the particle structure, and so forth, and furthermore, depending on the differences in the factors, the intensity peaks are shown in various manners depending on the three variables, i.e., the detection time t, the image coordinate Y (the position of the sample drop $S_d$), and the image coordinate X (the wavelength component λ). Thus, a specific arithmetic algorithm for the feature amount FV becomes complex, and an increase in computation load is assumed.

In contrast, as described in this embodiment, by executing a computational logic in the characteristic specifying unit 41 with the learned model M, the accuracy in the analysis is ensured while suppressing the increase in the computation load described above.

In addition, in this embodiment, provided is a learned model generation method for generating the learned model M, the learned model M using the time-spatial light spectrum $I_{d\_un}$ (t, X, Y) related to the sample drop $S_d$ as the input and the sample characteristic Ch as the output. This learned model generation method includes a processing of executing the machine learning by using the time-spatial light spectrum $I_{d\_un}$ (t, X, Y) related to the known sample $S_k$ as the input and the known characteristic $Ch_{\_k}$ indicating the property of the known sample $S_k$ as the output. The time-spatial light spectrum $I_{d\_un}$ (t, X, Y) is acquired by: intermittently introducing the known sample $S_k$ to the measurement region MA set in the plasma PL; detecting the light emission caused in the measurement region MA at the detection timing (the detection time $t=t_0$, $t_1$, $t_2$, etc.), the detection timing being set at the detection unit time $\Delta T_u$ in advance; and performing the computation thereof, based on the detected light emission, as the detection timing, the position in the measurement region MA (the image coordinate Y), and the distribution of the light intensity according to the wavelength component $\lambda_N$ (the image coordinate X).

By doing so, it is possible to acquire the learned model M capable of allowing the analyzer 39 to analyze the unknown characteristic $Ch_{\_u}$ for the unknown sample $S_{un}$ at a high accuracy.

Especially, by employing the deep learning model as the learned model M, it is possible to further improve the accuracy for the computation of the feature amount FV and the specification of the sample characteristic Ch.

In the scope of disclosure herein also includes the learned model M independently from the configuration of the sample analysis system 10 described with reference to FIG. 1, etc. In other words, the scope of disclosure herein includes the learned model M that is obtained by executing the machine learning by setting the time-spatial light spectrum $I_{d\_k}$ (t, X, Y) related to the known sample $S_k$ in the input (the input layer) and the known characteristic $Ch_{\_k}$ indicating the property of the known sample $S_k$ in the output (the output layer).

Furthermore, the scope of disclosure herein includes the sample analysis method using the learned model M, and in the sample analysis method, the obtained time-spatial light spectrum $I_{d\_un}$ (t, X, Y) for the unknown sample $S_{un}$ is applied to the input (the input layer) of the learned model M, and specification is performed by using the output data (the sample characteristic Ch) as the property of the unknown particles $pc_{\_un}$ contained in the unknown sample $S_{un}$.

In this embodiment, the examples related to the learned model M, in which the time-spatial light spectrum $I_{d\_k}$ (t, X, Y) related to the liquid sample S is used as the input and the sample characteristic Ch is used as the output, and the method for generating the learned model M have been described. However, instead, it may be possible to realize the learned model M, in which the time series image group $I_m$ (t) that is the digital image data is used as the input and the sample characteristic Ch is used as the output, and the method for generating such a learned model M. In other words, an input vector of a predetermined dimension formed by combining variables (pixels, etc.) defining the respective time series images $i_{m\_t}$ forming the time series image group $I_m$ (t) with the detection time t associated with the respective images includes the information that enables extraction of the feature amount FV similarly to the time-spatial light spectrum $I_{d\_k}$ (t, X, Y). Therefore, by configuring the learned model M by using the time series image group $I_m$ (t) as a direct input, it is possible to omit processings for the computation of the time-spatial light spectrum $I_{d\_k}$ (t, X, Y) based on the time series image group $I_m$ (t).

More specifically, the scope of disclosure herein includes the learned model generation method for generating the learned model M in which the time series image group $I_m$ related to the sample drop $S_d$ is used as the input and the sample characteristic Ch is used as the output. Especially, In this learned model generation method, the time series image group $I_m$ (t) is acquired by: intermittently introducing the known sample $S_k$ to the measurement region MA set in the plasma PL; and performing image acquisition of the light emission caused in the measurement region MA at an image acquisition timing, the image acquisition timing being set at a predetermined cycle (the detection unit time $\Delta T_u$) in advance.

Although the embodiments of the present invention have been described in the above, the above-mentioned embodiments merely illustrate a part of application examples of the present invention, and the technical scope of the present invention is not intended to be limited to the specific configurations of the above-described embodiments.

For example, the sample characteristic Ch is not limited to the composition, the particle size, the particle structure, and the particle-size distribution for the particles p contained in the liquid sample S as described above in the respective embodiments, and arbitrary characteristics of the particles p or characteristic of the liquid sample S itself other than those mentioned above may be applied as long as the characteristics may be specified from the above-described time-spatial light spectrum $I_d$ (t, X, Y). For example, by analyzing a boiling point of the liquid component or a melting point of the solid component of the liquid sample S from the time-spatial light spectrum $I_d$ (t, X, Y) that is measured by increasing the time resolution (by shortening the detection unit time $\Delta T_u$), a chemical binding structure (for example, a carbon structure, etc.) of the elements forming the liquid sample S may be specified as the sample characteristic Ch.

Although FIG. 1 shows an example in which the analyzer 39 is provided in the sample analysis system 10 separately from the high speed camera 38, it may be possible to configure such that the function of the analyzer 39 is incorporated into the high speed camera 38. Furthermore, the analyzer 39 may be configured as an external system capable of performing communication with the sample analysis system 10 of this embodiment.

For example, in the above-mentioned embodiment, a description has been given of an example in which the time series image group $I_m$ (t) is generated by image generating means (the high speed camera 38) from the two-dimensional image detected by the detection device (the imaging intensifier 36), and the time-spatial light spectrum $I_d$ (t, X, Y) is obtained by the analyzer 39. However, in the above-described sample analysis system 10, the high speed camera 38 may be omitted, and it may be possible to employ a device that measures the time-spatial light spectrum $I_d$ (t, X, Y) directly from the two-dimensional image without generating the time series image group $I_m$.

Furthermore, in the above-mentioned embodiment, a description has been given of an example in which the detection is performed by using the imaging intensifier 36 as the detection device for detecting the spatial distribution of the light from the spectrometer 34 as the two-dimensional image. However, the detection device other than the imaging intensifier 36 may also be used. For example, it may also be possible to employ a configuration in which a device capable of detecting the spatial distribution of the light from the spectrometer 34 as a three-dimensional image is used, and the measurement of the three-dimensional image is performed by the measuring device.

In addition, a description has been given of an example in which the sample drop $S_d$ is introduced intermittently by the configuration in which the opening and closing mechanism 20a of the droplet head 20 is opened and closed at the desired opening and closing cycle $\Delta T_f$. However, the configuration is not limited thereto, and it may also be possible to employ a configuration in which a solid or gelatinous sample, etc. is fed. In this case, because the sample can be introduced in the form of particles without using the opening and closing mechanism 20a, it may also be possible to employ the droplet head 20 that is provided with, instead of the opening and closing mechanism 20a, any mechanism for introducing the sample particles one by one. In addition, a storage medium in which a program for realizing the functions of the image analyzer 40 and the characteristic specifying unit 41 described in the first embodiment is stored and a storage medium in which the learned model M described in the second embodiment is stored are also included in a scope of described matters in the description, etc. at the time of filing of the present application.

EXAMPLE

In the following, the present invention will be described in more detail with following examples. The present invention is not, however, limited to these examples.

Example 1

By using the sample analysis system 10 shown in FIG. 1, with the devices and the measurement conditions described below, the time series image group $I_m$ (t) of the plasma PL was generated, and the time-spatial light spectrum $I_d$ (t, X, Y) was analyzed.

[Device]
  Droplet Controller 30: MD-K-13070 µm (from microdrop Technologies GmbH)
  Spectrometer 34: ShamrockSR-750 (from Andor Technology Ltd)
  Image Intensifier 36: Image Intensifier Unit C10880-13F (from HAMAMATSU PHOTONICS K.K.)
  High Speed Camera 38: FASTCAM Mini AX100540 K-M-16 GB (from PHOTRON LIMITED)

Figure 10:
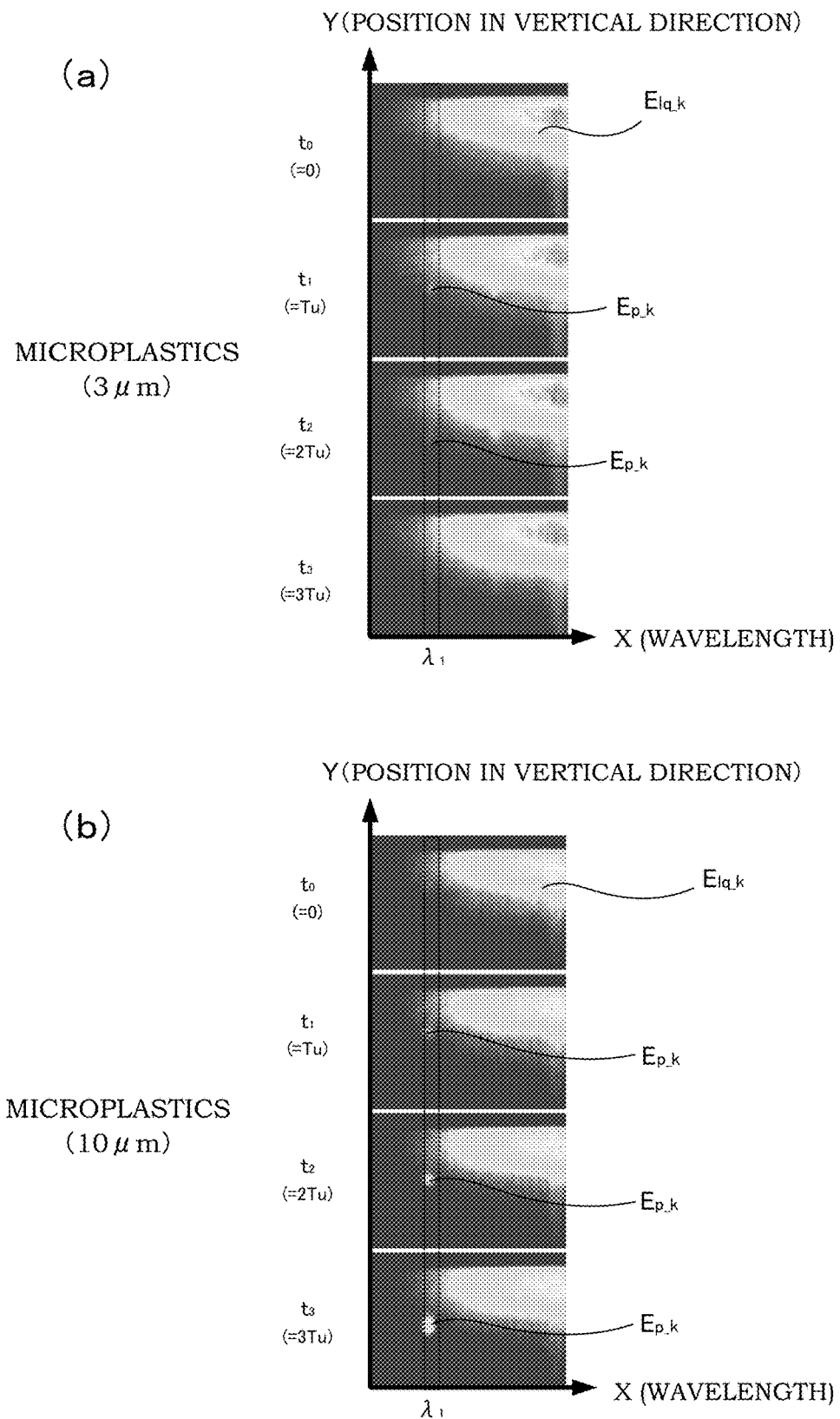
FIG. 10 is a diagram showing respective time series images of microplastics having the particle diameter of 3 μm and the particle diameter of 10 μm in Example 1.

[Measurement Conditions]
  Sample: two kinds of dispersion liquids respectively containing dummy microplastics (the polystyrene beads) with the particle diameter of 3 µm and the particle diameter of 10 µm
  The power supply to the coil 22 (ICP power): 400 w
  The frame rate of the high speed camera 38: 10000 fps (the detection unit time $\Delta T_u$: 100 µs)
  The opening and closing cycle (the droplet frequency) of the opening and closing mechanism 20a: 100 Hz
  The droplet diameter (the diameter of the opening of the opening and closing mechanism 20a): 50 µm
  The measurement region MA: 10 mm From the time series image group $I_m$ (t) including the influence due to the excitation light derived from the microplastics respectively having the particle diameters of 3 µm and 10 µm, four time series images $i_{m\_t0}$ to $i_{m\_t3}$ were extracted after arrival of the sample drop $S_d$ to the emission start point $P_{O1}$. The time series images $i_{m\_t0}$ to $i_{m\_t3}$ extracted for the microplastics respectively having the particle diameters of 3 µm and 10 µm were respectively shown in FIGS. 10(a) and 10(b).

Figure 11:
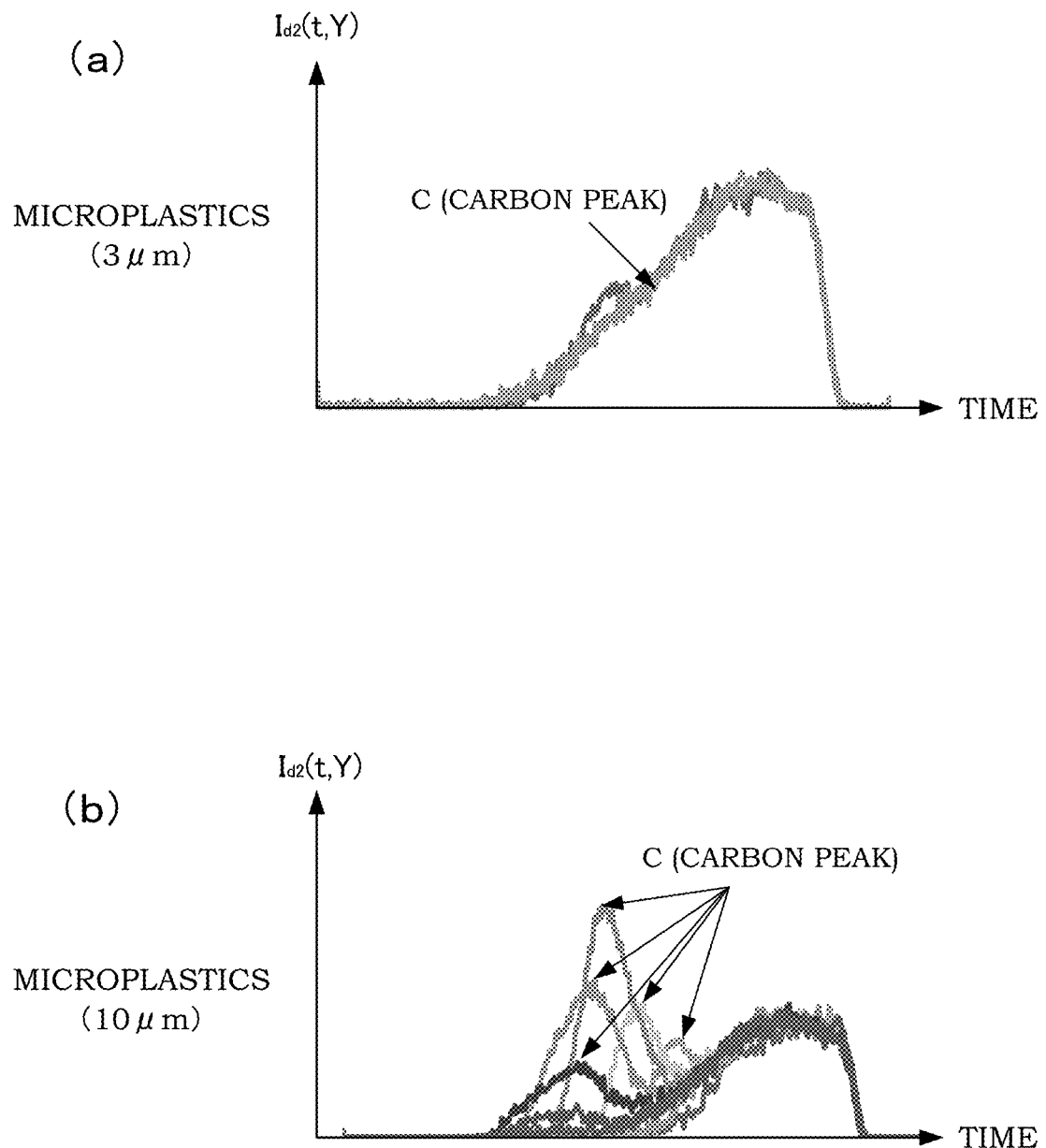
FIG. 11 is a diagram showing a time light intensity distribution of the microplastics having the particle diameter of 3 μm and the particle diameter of 10 μm in Example 1.

In addition, the respective time series images $i_{m\_t0}$ to $i_{m\_t3}$ extracted for the microplastics respectively having the particle diameters of 3 µm and 10 µm were analyzed by the analyzer 39 to respectively obtain the time-spatial light spectrum $I_d$ (t,X,Y) according to the image coordinate (X, Y) and the detection time t. Furthermore, the respective time-spatial light spectra $I_d$ (t, X, Y) were integrated in a range of the image coordinate X corresponding to a wavelength range of measurement target element to respectively obtain the time/position optical spectra $I_{d2}$ (t, Y). The time/position optical spectra $I_{d2}$ (t, Y) for the microplastics respectively having the particle diameters of 3 µm and 10 µm were respectively shown in FIGS. 11(a) and 11(b). A plurality of curves shown in FIG. 11(a) or FIG. 11(b) show the time/position optical spectra $I_{d2}$ (t, Y) according to the image coordinate Y.

[Results and Discussion]
With the microplastics having the particle diameter of 3 µm and the particle diameter of 10 µm, differences were seen for the time series images $i_{m\_t0}$ to $i_{m\_t3}$ and the time/position optical spectrum $I_{d2}$ (t, Y). Especially, for the time series image group $I_m$ (t), it can be seen that the progression of the excitation of the microplastics having the particle diameter of 3 µm is earlier than that of the microplastics having the particle diameter of 10 µm. In addition, in the time/position optical spectrum $I_{d2}$ (t, Y) for the microplastics having the particle diameter of 3 µm, the appearance of the intensity peak (the peak derived from carbon) is earlier than that for the microplastics having the particle diameter of 10 µm, and the peak intensity is smaller than that for the microplastics having the particle diameter of 10 µm. Thus, it can be seen that, even with the particles having the same composition, the time-spatial light spectrum $I_d$ (t, X, Y) is changed if the particle diameters are different. In other words, it can be said that the difference in the particle diameter for the particles having the same composition can be analyzed from the time-spatial light spectrum $I_d$ (t, X, Y).

Example 2

By using the sample analysis system 10 shown in FIG. 1, with the devices and the measurement conditions described below, the particle-size distribution of the microplastics contained in the liquid sample S was analyzed.

[Device]

The same as in Example 1

[Measurement conditions]

Sample: microplastics with two kinds of particle diameters (the particle diameters of 3 µm and 10 µm) (the polystyrene beads) were mixed together and mixed into a dispersion liquid. The concentrations were adjusted such that a beads abundance probability in one droplet become 25% for 3 µm and 5% for 10 µm.

The measurement time: 2 s

Other conditions were the same as those in Example 1.

By using the similar method as in Example 1, the time/position optical spectrum $I_{d2}$ (t, Y) was integrated for each droplet to obtain the time optical spectrum $I_{d3}$ (t). FIG. 12 (*a*) shows the time optical spectrum $I_{d3}$ (t) for every droplet (for every shot).

In other words, each scale mark on the horizontal axis in FIG. 12 (*a*) indicates every count of the droplet count $D_p$ (about 1 ms intervals) in the total number of drops (200 counts) within 2 s of the measurement time. On the other hand, the vertical axis indicates an integrated value for the time optical spectrum $I_{d3}$ (t) for each droplet count D. Furthermore, FIG. 12 (*b*) shows the particle-size distribution obtained on the basis of the results shown in FIG. 12 (*a*).

[Results and Discussion]

In the sample in which two kinds of particle diameters of 3 µm and 10 µm were mixed, respective peaks were identified as the particle-size distribution. In other words, it can be said that the particle-size distribution can be acquired from the time-spatial light spectrum $I_d$ (t, X, Y).

Example 3

By using the sample analysis system 10 shown in FIG. 1, with the devices and the measurement conditions described below, the time series image group $I_m$ (t) of the plasma PL was generated and the time-spatial light spectrum $I_d$ (t, X, Y) was analyzed.

[Device]

The same as in Example 1

[Measurement conditions]

Sample 1: the mixed liquid obtained by mixing 100 ppm of Ag nanoparticles (the average particle diameter: 90 nm) and 10 ppm of Au nanoparticles (the average particle diameter: 20 nm)

Sample 2: the mixed liquid obtained by mixing the core shell particles, each particle thereof having the outer shell formed of Ag and the core formed of Au (the average particle diameter: 90 nm, the core diameter: 20 nm), at 100 ppm Power supply to the coil 22 (ICP power): 400 w The frame rate of the high speed camera 38: 50000 fps (the detection unit time $\Delta T_u$: 20 µs)

Figure 13:
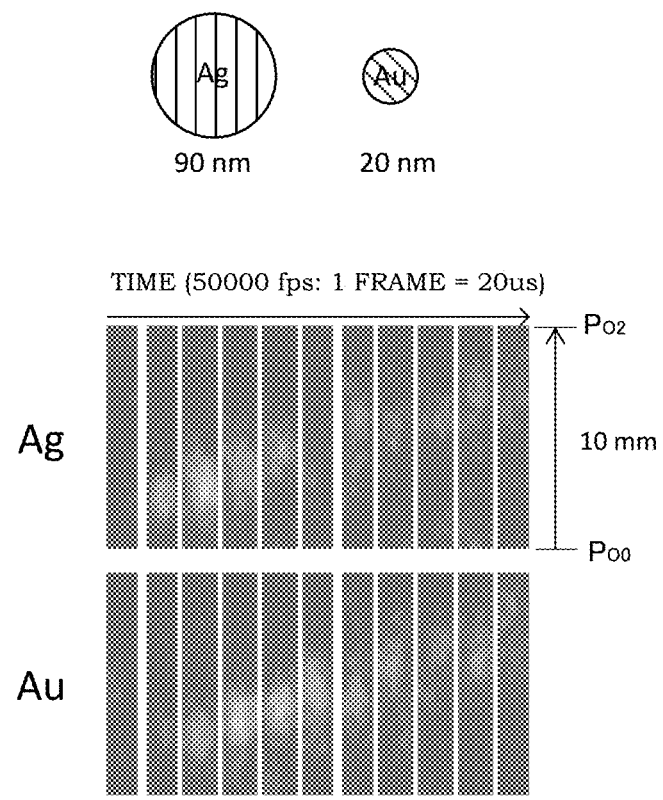
FIG. 13 is a diagram showing the time series image group acquired for the liquid sample (containing Ag particles and Au particles that are separated) according to Example 2.

The opening and closing cycle (the droplet frequency) of the opening and closing mechanism 20*a*: 100 Hz The droplet diameter (the diameter of the opening of the opening and closing mechanism 20*a*): 50 µm The measurement region MA: 5 mm From the time series image group $I_m$ (t) acquired for each of the mixed liquids for the samples 1 and 2, eleven time series images $i_{m\_t0}$ to $i_{m\_t10}$ were extracted at every detection unit time $\Delta T_u$ since one unit of detection unit time $\Delta T_u$ before the arrival of the sample drop $S_d$ to the emission start point $P_{O1}$. The time series images $i_{m\_t0}$ to $i_{m\_t10}$ for the sample 1 are shown in FIG. 13. In addition, the time series images $i_{m\_t0}$ to $i_{m\_t10}$ for the sample 2 are shown in FIG. 14.

Furthermore, the time series images $i_{m\_t0}$ to $i_{m\_t10}$ respectively extracted for the samples 1 and 2 were analyzed by the analyzer 39 to respectively obtain the time-spatial light spectra $I_d$ (t, X, Y) according to the image coordinate (X, Y) and the detection time t. Furthermore, the respective time-spatial light spectra $I_d$ (t, X, Y) were integrated in the wavelength range of the measurement target element (the sum of the respective wavelength ranges for Ag and Au) in both of the image coordinate X, and the image coordinate Y to respectively obtain the time optical spectra $I_{d3}$ (t). The time optical spectra $I_{d3}$ (t) for the sample 1 is shown in FIG. 15 (*a*). In addition, the time optical spectrum $I_{d3}$ (t) for the sample 2 is shown in FIG. 15 (*b*).

[Results and Discussion]

In Example 3, differences were caused between the sample 1, which was the mixed liquid formed by separately mixing the Ag nanoparticles and the Au nanoparticles, and the sample 2, which was the mixed liquid formed by mixing the core shell particles of Ag/Au, for both of the time series images $i_{m\_t0}$ to $i_{m\_t10}$ and the time optical spectrum $I_{d3}$ (t). Especially, from these measurement result, it can be seen that, compared with the sample 1 containing the Ag nanoparticles and the Au nanoparticles in a separated state, for the sample 2, in which the Ag nanoparticles and the Au nanoparticles were bind together to form the core shell structure, the peak derived from the Au nanoparticles forming the core was shifted towards the direction in which the progression of the excitation is delayed. Thus, it can be seen that, even if the combinations of the elements of the particles contained in the sample are the same, if associated forms (the structures) of the respective elements are different, the time-spatial light spectrum $I_d$ (t, X, Y) is changed. In other words, it can be said that it is possible to analyze the difference in the particle structure for the particles having the same composition from the time-spatial light spectrum $I_d$ (t, X, Y).

The present application claims priority to Japanese Patent Application No. 2020-028438, filed in the Japan Patent Office on Feb. 21, 2019. The contents of this application are incorporated herein by reference in their entirety.

The invention claimed is:

1. A sample analysis system comprising:
    a droplet device configured to intermittently introduce a sample to a measurement region set in plasma;
    a light emission detection device configured to detect light emission in the measurement region at a detection timing, the detection timing being set at a predetermined cycle in advance; and
    an analysis device configured to analyze the sample based on the detected light emission, wherein
    the analysis device is provided with:
        a distribution computing unit configured to compute a time-spatial light intensity distribution based on the detected light emission, the time-spatial light intensity distribution being a distribution of a light intensity according to the detection timing, a position in the measurement region, and a wavelength component of the light emission; and
        a characteristic specifying unit configured to compute, from the time-spatial light intensity distribution, a feature amount that correlates with a sample characteristic indicating a property of the sample and specify the sample characteristic based on the feature amount.

2. The sample analysis system according to claim 1, wherein
    the sample characteristic includes an element of a particle forming the sample; and at least one of a particle size and a particle structure.

3. The sample analysis system according to claim 2, wherein
    the sample is a liquid sample formed by mixing one or more kinds of particle with a predetermined liquid,
    the droplet device is provided with an opening and closing mechanism configured to open and close an injection port such that the liquid sample is introduced into the plasma in a form of a drop with a desired diameter, and
    the analysis device is configured to adjust an opening and closing cycle in the opening and closing mechanism based on a concentration of the particle contained in the liquid sample.

4. The sample analysis system according to claim 2, wherein
    the characteristic specifying unit is configured to compute, as the feature amount, a first peak intensity, the detection timing at the first peak intensity, and the position in the measurement region at the first peak intensity, the first peak intensity being a peak intensity in a case in which the time-spatial light intensity distribution is integrated in the wavelength component, and
    the characteristic specifying unit is configured to specify the particle size based on the feature amount.

5. The sample analysis system according to claim 4, wherein
    the sample characteristic includes the particle structure that is a form in which one or more kinds of element forming the particle are combined, and
    the characteristic specifying unit is configured to further specify the particle structure based on the feature amount.

6. The sample analysis system according to claim 4, wherein
    the sample characteristic includes, in a case in which the sample contains the particles respectively having different particle sizes, an abundance ratio for each particle,
    the characteristic specifying unit is configured to compute, as the feature amount, a second peak intensity and the detection timing at the second peak intensity, the second peak intensity being the peak intensity in a case in which the time-spatial light intensity distribution is integrated in the wavelength component and the position in the measurement region, and
    the characteristic specifying unit is configured to specify the abundance ratio based on the feature amount.

7. The sample analysis system according to claim 1, wherein
    the characteristic specifying unit is formed of a learned model, the learned model using the time-spatial light intensity distribution as an input and the sample characteristic as an output, and wherein
    the learned model is:
        obtained by executing a machine learning in which the time-spatial light intensity distribution related to a known sample is set in the input and a known characteristic indicating a property of the known sample is set in the output, and
        configured to operate the analysis device such that the time-spatial light intensity distribution obtained for an unknown sample is set as the input and an unknown characteristic indicating the property of the unknown sample is set as the output.

8. A sample analysis method comprising:
    intermittently introducing a sample to a measurement region set in plasma;
    detecting light emission caused in the measurement region at a detection timing, the detection timing being set at a predetermined cycle in advance;
    computing a time-spatial light intensity distribution based on the detected light emission, the time-spatial light intensity distribution being a distribution of a light intensity according to the detection timing, a position in the measurement region, and a wavelength component of the light emission;
    computing, from the time-spatial light intensity distribution, a feature amount that correlates with a sample characteristic indicating a property of the sample; and
    specifying the sample characteristic based on the feature amount.

9. A sample analysis system comprising:
    a sample feeder that is disposed above a measurement region set in plasma and introduces a piece of sample to the measurement region;
    a photodetector that detects light emission spectrum in the measurement region; and
    circuitry configured to
        receive data related to the light emission spectrum from the piece of the sample,
        analyze data of a time-spatial light intensity distribution based on the light emission spectrum, the time-spatial light intensity distribution being a distribution of a light intensity according to a detection timing set at a predetermined cycle, a position in the measurement region, and a wavelength component of the light emission spectrum,
        derive, from the time-spatial light intensity distribution, a feature amount that correlates with a sample characteristic indicating a property of the piece of sample, and specify the sample characteristic based on the feature amount.

10. The sample analysis system according to claim 9, wherein
the sample characteristic includes an element of a particle forming the sample; and at least one of a particle size and a particle structure.

11. The sample analysis system according to claim 10, wherein
the piece of sample is a liquid sample including mixing one or more kinds of particle with a predetermined liquid.

12. The sample analysis system according to claim 11, wherein
the sample feeder feeds the piece of sample as a droplet of the liquid sample by an opening and closing structure, and
the opening and closing structure is configured to adjusts a diameter of the droplet according to a concentration of the particle contained in the liquid sample.

13. The sample analysis system according to claim 10, wherein
the circuitry is configured to
compute, as the feature amount, a first peak intensity, the detection timing at the first peak intensity, and the position in the measurement region at the first peak intensity, the first peak intensity being a peak intensity in a case in which the time-spatial light intensity distribution is integrated in the wavelength component, and
specify the particle size based on the feature amount.

14. The sample analysis system according to claim 13, wherein
the sample characteristic includes the particle structure that is a form in which one or more kinds of element forming the particle are combined, and
the circuitry is further configured to specify the particle structure based on the feature amount.

15. The sample analysis system according to claim 13, wherein
the sample characteristic includes, in a case in which the sample contains the particles respectively having different particle sizes, an abundance ratio for each particle,
the circuitry is further configured to
compute, as the feature amount, a second peak intensity and the detection timing at the second peak intensity, the second peak intensity being the peak intensity in a case in which the time-spatial light intensity distribution is integrated in the wavelength component and the position in the measurement region, and
specify the abundance ratio based on the feature amount.

16. The sample analysis system according to claim 9, wherein
the circuitry is configured to perform a learned model, the learned model using the time-spatial light intensity distribution as an input and the sample characteristic as an output, the learned model being obtained by executing a machine learning in which the time-spatial light intensity distribution related to a known sample is set in the input and a known characteristic indicating a property of the known sample is set in the output, and
the circuitry is configured to perform the learned model by setting the time-spatial light intensity distribution obtained for an unknown sample as the input, and an unknown characteristic indicating the property of the unknown sample as the output.

17. The sample analysis system according to claim 9, the sample feeder feeds the piece of sample as at least one of a droplet, a solid, or a gel.

18. The sample analysis system according to claim 9, the time-spatial light intensity distribution is obtained while the piece of the sample is falling in the measurement region by gravity.

* * * * *